United States Patent
Hsu et al.

(10) Patent No.: US 9,456,256 B2
(45) Date of Patent: Sep. 27, 2016

(54) ROUTING CIRCUIT AND CIRCUIT HAVING THE ROUTING CIRCUIT

(71) Applicant: Nuvoton Technology Corporation, Hsinchu (TW)

(72) Inventors: Chi-Chuang Hsu, Hsinchu (TW); Tsung-Yao Wang, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 342 days.

(21) Appl. No.: 13/831,914

(22) Filed: Mar. 15, 2013

(65) Prior Publication Data

US 2013/0287019 A1 Oct. 31, 2013

(30) Foreign Application Priority Data

Apr. 30, 2012 (TW) .............................. 101115378 A

(51) Int. Cl.
  *H04Q 3/56* (2006.01)
  *G06F 13/38* (2006.01)
  *G06F 7/14* (2006.01)

(52) U.S. Cl.
  CPC *H04Q 3/56* (2013.01); *G06F 7/14* (2013.01); *G06F 13/38* (2013.01)

(58) Field of Classification Search
  CPC ............ G06F 7/14; G06F 13/38; H04Q 3/56
  See application file for complete search history.

(56) References Cited

U.S. PATENT DOCUMENTS

| | | | |
|---|---|---|---|
| 6,839,795 B1 | 1/2005 | Fernald et al. | |
| 7,586,917 B1* | 9/2009 | Ferguson | H04L 69/14 370/389 |
| 8,149,854 B2* | 4/2012 | Lau et al. | 370/412 |
| 8,990,501 B1* | 3/2015 | Sellers et al. | 711/121 |
| 2002/0159449 A1* | 10/2002 | Carson et al. | 370/389 |
| 2006/0221945 A1* | 10/2006 | Chin et al. | 370/381 |
| 2010/0261431 A1* | 10/2010 | Olgaard | 455/67.11 |
| 2012/0025397 A1* | 2/2012 | Miller | H01L 23/50 257/777 |
| 2013/0242993 A1* | 9/2013 | Basso | H04L 45/16 370/390 |

* cited by examiner

*Primary Examiner* — Redentor Pasia
(74) *Attorney, Agent, or Firm* — Jianq Chyun IP Office

(57) ABSTRACT

A routing circuit and a circuit having the routing circuit are provided. The circuit includes a plurality of integrated circuits (ICs), a plurality of signal terminals and the routing circuit. Each of the ICs has a plurality of signal channels. The routing circuit is coupled between the ICs and the signal terminals to route the signal channels to the signal terminals. The routing circuit has a plurality of sequencers and a processing circuit. Each of the sequencers is configured to reconfigure an arrangement sequence of the signal channels of a corresponding one of the ICs. The processing circuit is coupled to the sequencers and has a first distributor. The first distributor routes the signal channels to the signal terminals in a group manner based on the arrangement sequences of the signal channels reconfigured by the sequencers according to a control signal.

18 Claims, 20 Drawing Sheets

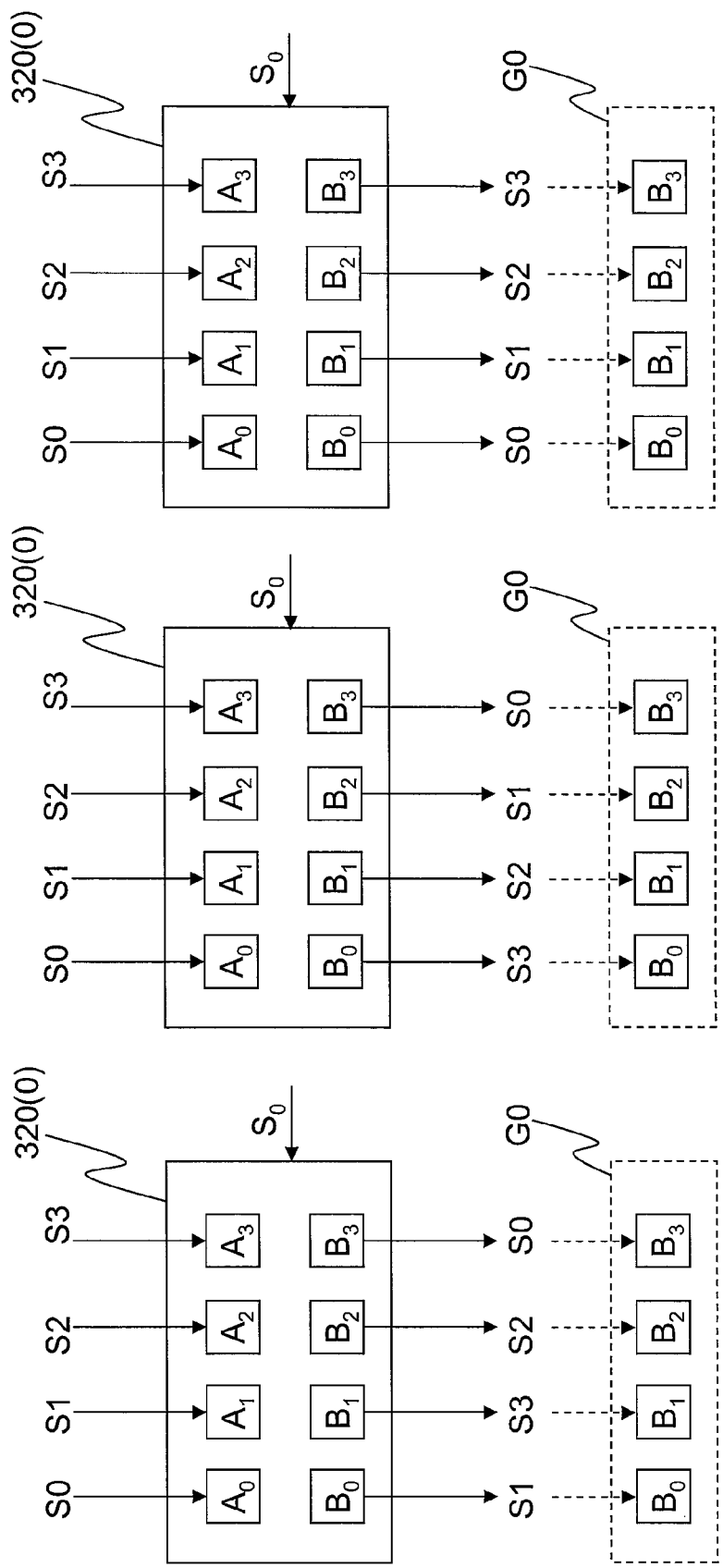

ROUTING CIRCUIT AND CIRCUIT HAVING THE ROUTING CIRCUIT

CROSS-REFERENCE TO RELATED APPLICATION

This application claims the priority benefit of Taiwan application Ser. No. 101115378, filed on Apr. 30, 2012. The entirety of the above-mentioned patent application is hereby incorporated by reference herein and made a part of this specification.

BACKGROUND

1. Technical Field

The embodiments of the invention relates to a routing circuitry and a circuit having the routing circuit, and more particularly to a routing circuit and circuits having the routing circuit which has the capability to adaptively route a plurality of signal channels to a plurality of signal terminals.

2. Description of Related Art

In microcontroller products, there are various interfaces (i.e. communication interfaces or storage interfaces) to meet the needs of many applications. However, the total pins that are required for the operation of all the interfaces on a same chip may exceed the pins on the chip, resulting in a situation where the pins on the chip are insufficient for the interfaces to use. Furthermore, system integrators usually will not utilize all the function of interfaces of the chip for applications. Therefore, the chip designers usually analyze all the application type first, and assign multiple functions to each pin of the chip to satisfy the most application needs out of all the combination of the functions of the chip.

In the applications of many chips, the pins for certain functions on the chip are expected to be at particular positions. Particularly for a Multi-Chip Package (MCP), the positions and the arrangement sequences of a plurality of chips within the MCP have been set. Therefore, to perform routing on the MCP will encounter many limitations, thus it may not be able to meet the specific needs of application.

In U.S. Pat. No. 6,839,795 published on Jan. 4, 2005, entitled "Priority Cross-Bar Decoder", a plurality of interfaces is configured with priority, and the pins routed base on the set priority.

SUMMARY

According to one embodiment of invention, a routing circuit which is configured to route the signal channels of a plurality of integrated circuits to the signal terminals is provided. The routing circuit includes plural sequencers and a processing circuit. Each of the sequencers is configured to reconfigure the arrangement sequence of the signal channels of a corresponding integrated circuit. The processing circuit is coupled between the aforementioned sequencers and the signal terminals, and also includes a first distributor. The first distributor is configured to route the signal channels to the signal terminals in group manner according to a control signal and base on the arrangement sequences of the signal channels of the integrated circuits reconfigured by the sequencers.

According to another embodiment of invention, a circuit which includes a plurality of integrated circuits, a plurality of signal terminals, and a routing circuit is provided. Each of the integrated circuits has a plurality of signal channels. The routing circuit is coupled between the integrated circuits and the signal terminals, which is configured to route the signal channels of the integrated circuit to the signal terminals. The routing circuit includes a plurality of sequencers and a processing circuit. Each of the sequencers is configured to reconfigure the arrangement sequence of the signal channels of a corresponding integrated circuit. The processing circuit is coupled to the sequencers, and includes a first distributor. The first distributor is configured to route the signal channels to the signal terminals in group manner according to a control signal and base on the arrangement sequences of the signal terminals of the integrated circuits reconfigured by the sequencers.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 4A to FIG. 4C illustrate how a sequencer reconfigures the arrangement sequence of a plurality of signal channels of an integrated circuit according to an embodiment of the invention.

DETAILED DESCRIPTION OF DISCLOSED EMBODIMENTS

Figure 1:
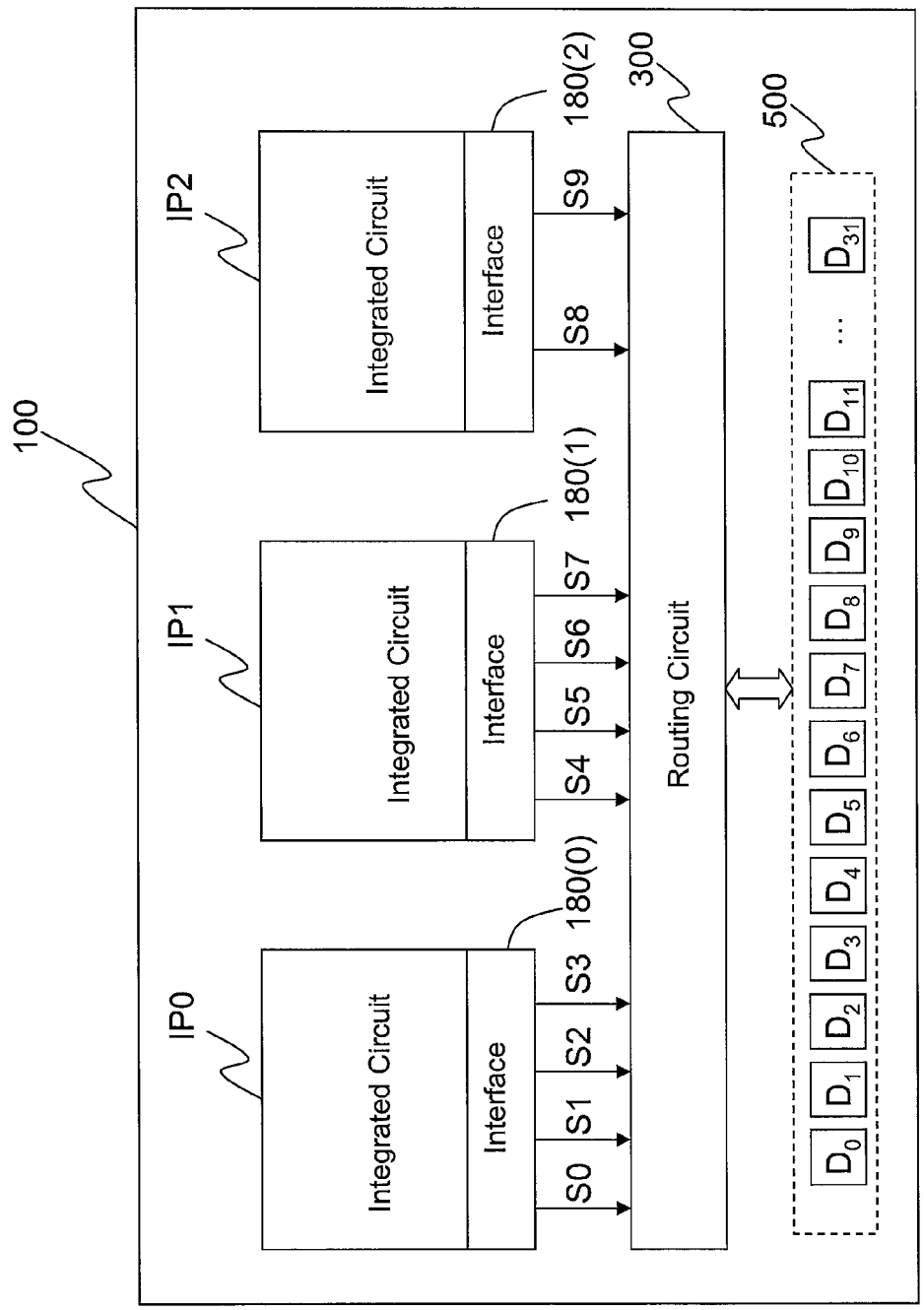
FIG. 1 is a functional block diagram of a circuit according to an embodiment of the invention.

Referring to FIG. 1, FIG. 1 is a functional block diagram of a circuit 100 according to an embodiment of the invention. The circuit 100 has a plurality of integrated circuits IP0-IP2, a routing circuit 300, and an output interface 500. The integrated circuits IP0-IP2 may be formed on the same semiconductor substrate (i.e. silicon substrate) or on different semiconductor substrates such as GaAs substrate, GaP substrate, or InP substrate. Each of the integrated circuits IP0-IP2 is configured to provide specific functions, such as communication, storage, calculation, measure, and other functions, but not limited thereto. Each of the integrated circuits IP0-IP2 has a corresponding interface 180(0), 180(1) or 180(2), and each of the interfaces 180(0)-180(2) has a plurality of signal channels S0-S3, S4-S7, or S8-S9. Each of the signal channels S0-S9 is configured to transmit (i.e. output or input) signals of the corresponding integrated circuits. In an embodiment of the invention, the integrated circuits IP0-IP2 share certain common circuit such as power supply circuit, electrostatic protection circuit, and other circuits. In an embodiment of the invention, the integrate circuits IP0-IP2 operate independently. Furthermore, the output interface 500 has a plurality of signal terminals $D_0$-$D_{31}$. The routing circuit 300 is coupled between the signal channels S0-S9 of the integrated circuits IP0-IP2 and the signal terminals $D_0$-$D_{31}$ of the output interface 500, and is configured to route the signal channels S0-S9 to the signal terminals $D_0$-$D_{31}$. Each signal terminals $D_0$-$D_{31}$ may be a pin, a pad, or any other form of terminals, and are configured to transmit signals of the signal channels S0-S9.

It should be noted that the number of the integrated circuits, the number of the signal terminals, and the number of signal channels of each integrated circuit in the embodiments are configured for illustration. For those one skilled in the art should understand that the number of the integrated circuits, the number of the signal terminals, and the number of signal channels of each integrated circuit in the embodiments of the invention may be other numbers. Furthermore, the number of the integrated circuits in the circuit 100 may be two, four, or more instead of three. The number of the signal channels of each of the integrated circuits IP0-IP2 may be two, three, four, or more. In addition, the number of the signal terminals is only required to meet the minimum requirement of the applications. For example, if the functions of the integrated circuits IP0 and IP2 are required and not the integrated circuit IP1, the number of the signal terminals may be six.

Figure 2B:
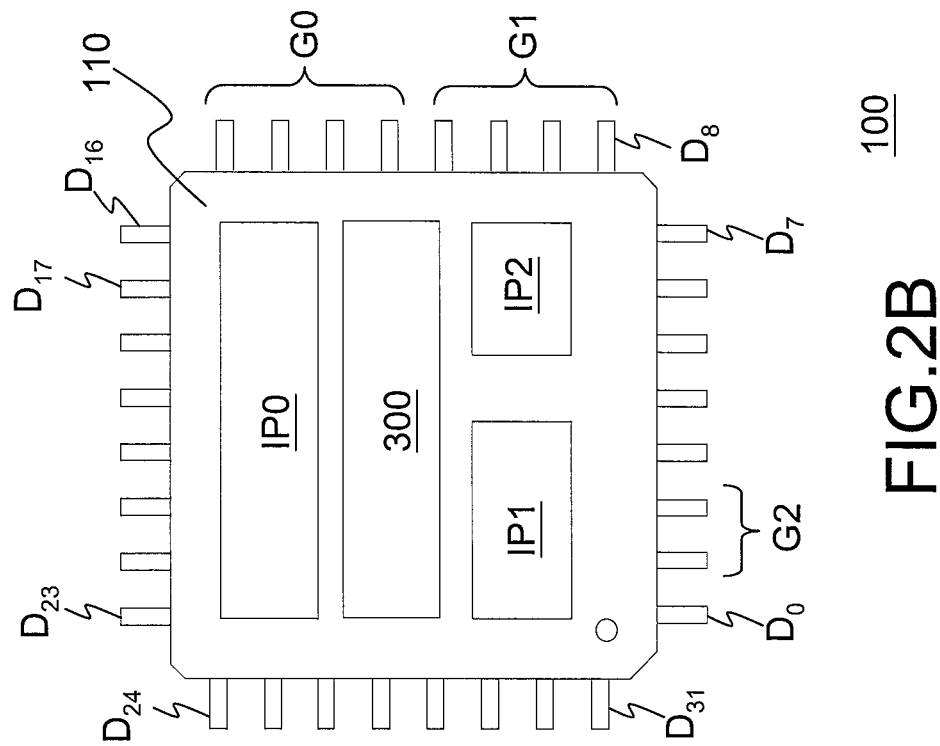
FIG. 2A and FIG. 2B illustrate the applications of the circuit respectively according to an embodiment of the invention.
Figure 2A:
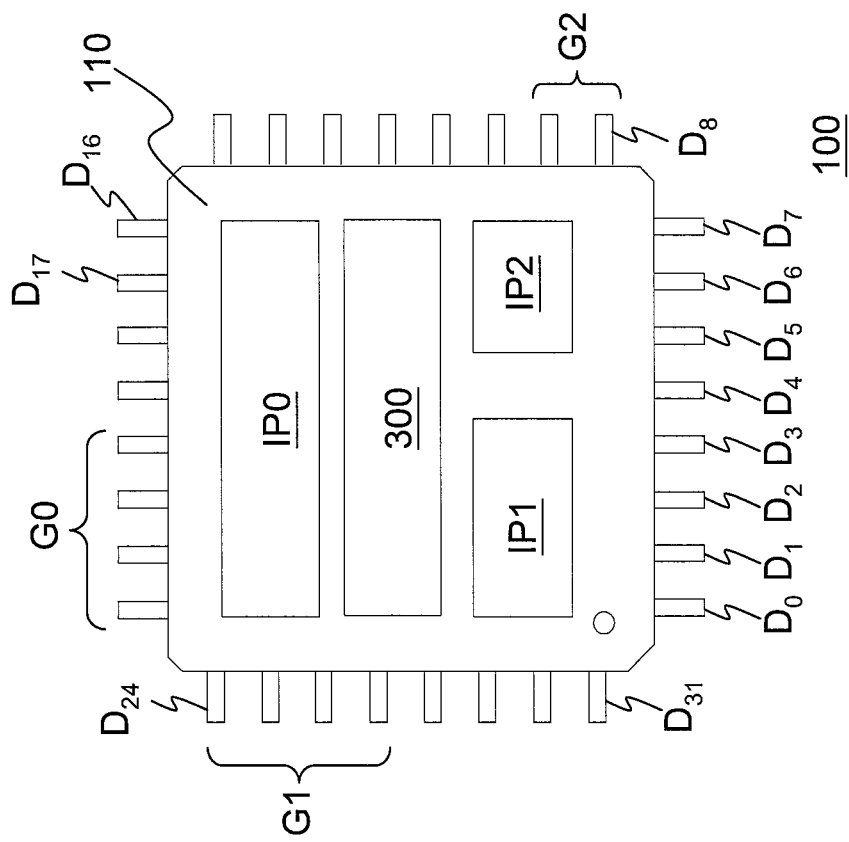

Referring to FIG. 2A and FIG. 2B. FIG. 2A and FIG. 2B illustrate the applications of the circuit 100 respectively according to an embodiment of the invention. Wherein, the integrated circuits IP0-IP2 and the routing circuit 300 are packaged in a package 110, or disposed on the same chip. The routing circuit 300 routes the signal channels S0-S3 to four signal terminals which a group G0 corresponds to, the signal channels S4-S7 to four signal terminals which a group G1 corresponds to, and the signal channels S8-S9 to two signal terminals which a group G2 corresponds to. For example, in FIG. 2A, the group G0 corresponds to the signal terminals $D_{20}$-$D_{23}$, the group G1 corresponds to the signal terminals $D_{24}$-$D_{27}$, and the group G2 corresponds to the signal terminals $D_8$-$D_9$. Each of the groups G0-G2 corresponds to one of the integrated circuits IP0-IP2. In detail, the group G0 corresponds to the integrated circuit IP0, the group G1 corresponds to the integrated circuit IP1, and the group G2 corresponds to the integrated circuit IP2. In addition, as showing in the FIG. 2A and FIG. 2B, the signal terminals which the groups G0-G2 correspond to can be configured according to the needs. It should be noted that the signal terminals which the groups G0-G2 correspond to are not limited to the configurations of the FIG. 1 and FIG. 2.

It should be noted that even though the signal terminals $D_0$-$D_{31}$ in the FIG. 2A and FIG. 2B are disposed at the four side edges of the package 110, however, the invention is not limited thereto. For example, in an embodiment of the invention, the signal terminals $D_0$-$D_{31}$ can be disposed at the same side, bottom, or top of the package 110. In addition, in an embodiment of the invention, the signal terminals $D_0$-$D_{31}$ can be disposed at two different side edges of the package 110.

Figure 3:
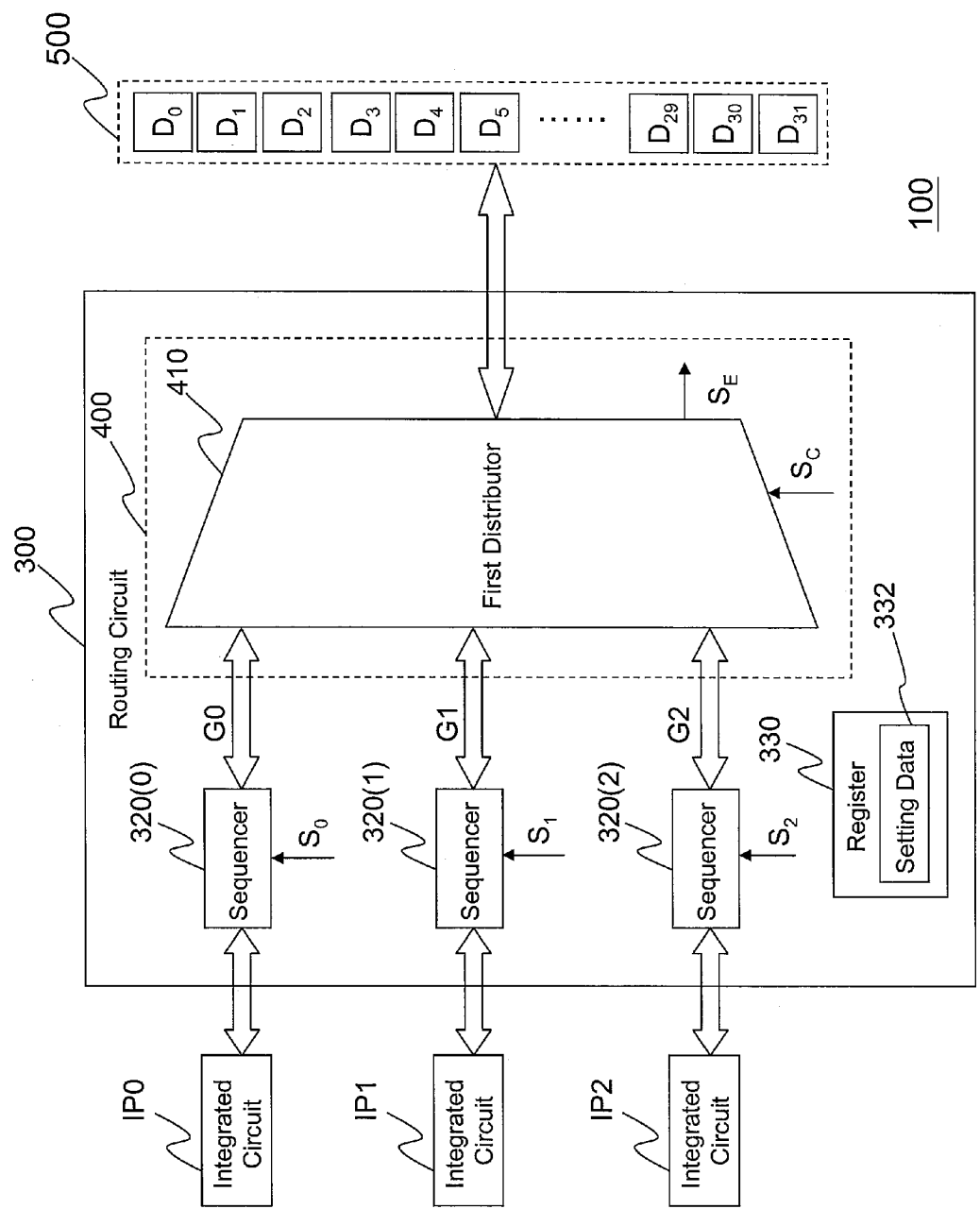
FIG. 3 is a schematic diagram of the circuit according to an embodiment of the invention.

Referring to FIG. 3, FIG. 3 is a schematic diagram of the circuit 100 according to an embodiment of the invention. The routing circuit 300 of the circuit 100 has a plurality of sequencers 320(0)-320(2) and a processing circuit 400. Each of the sequencers 320(0)-320(2) corresponds to one of the integrated circuits IP0-IP2 and is configured to reconfigure an arrangement sequence of the signal channels of the corresponding integrated circuits. For example, the sequencer 320(0) corresponds to the integrated circuit IP0, and configured to reconfigure the arrangement sequence of the signal channels S0-S3 of the integrated circuit IP0. How the sequencers reconfigure the arrangement sequence of the signal channels of the integrated circuits are described below. In the present embodiment, the sequencers 320(0)-320(2) may be circuits that operate independently. However in another embodiment, the sequencers 320(0)-320(2) may be integrated into a single circuit. Furthermore, the processing circuit 400 coupled to the sequencers 320(0)-320(2) includes a first distributor 410. The first distributor 410 is configured to route the signal channels S0-S9 to the signal terminals $D_0$-$D_{31}$ in group manners according to a control signal $S_C$ and base on the arrangement sequence of the signal channels which were reconfigured by the sequencers 320(0)-320(2). Regarding to how the first distributor 410 routes the signal channels S0-S9 to the signal terminals $D_0$-$D_{31}$ in group manners are described below.

Referring to FIG. 4A through FIG. 4C, FIGS. 4A to 4C respectively illustrate how the sequencer 320(0) reconfigures the arrangement sequence of the signal channels S0-S3 of the integrated circuit IP0 according to an embodiment of the invention. The sequencer 320(0) has a plurality of first terminals $A_0$-$A_3$ which are configured to transmit signals of the signal channels S0-S3 respectively. In addition, the sequencer 320(0) also has a plurality of second terminals $B_0$-$B_3$ which are configured to transmit signals of the signal channels S0-S3 respectively. Wherein, each of the first terminals $A_0$-$A_3$ is connected to one of the corresponding second terminals $B_0$-$B_3$. After the sequencer 320(0) reconfigures the arrangement sequence of the signal channels S0-S3, the connection relationship between the first terminals $A_0$-$A_3$ and the second terminals $B_0$-$B_3$ may change. By using FIG. 4A as example, the first terminals $A_0$, $A_1$, $A_2$, and $A_3$ are connected to the second terminals $B_3$, $B_0$, $B_2$, and $B_1$ respectively. By using FIG. 4B as example, the first terminals $A_0$, $A_1$, $A_2$, and $A_3$ are connected to the second terminals $B_3$, $B_2$, $B_1$, and $B_0$ respectively. By using FIG. 4B as example, the first terminals $A_0$, $A_1$, $A_2$, and $A_3$ are connected to the second terminals $B_0$, $B_1$, $B_2$, and $B_3$ respectively. It should be noted that connection relationship between the first terminals $A_0$-$A_3$ and the second terminals $B_0$-$B_3$ are not limited to the examples described above, and the invention is not limited thereto. The reconfigured signal channels S0-S3 by the sequencer 320(0) may be grouped under the same group G0, and then the group G0 is represented by the second terminals $B_0$-$B_3$. In addition, in an embodiment of the invention, the sequencer 320(0) is controlled by a control signal $S_0$. The sequencer 320(0) reconfigures the arrangement sequence of the signal channels S0-S3 according to the control signal $S_0$. A different control signal $S_0$ corresponds to a different arrangement sequence of the signal channels S0-S3. Therefore, the arrangement sequence of the signal channels S0-S3 may be configured to the required arrangement sequence by the control signal $S_0$.

Figure 4D:
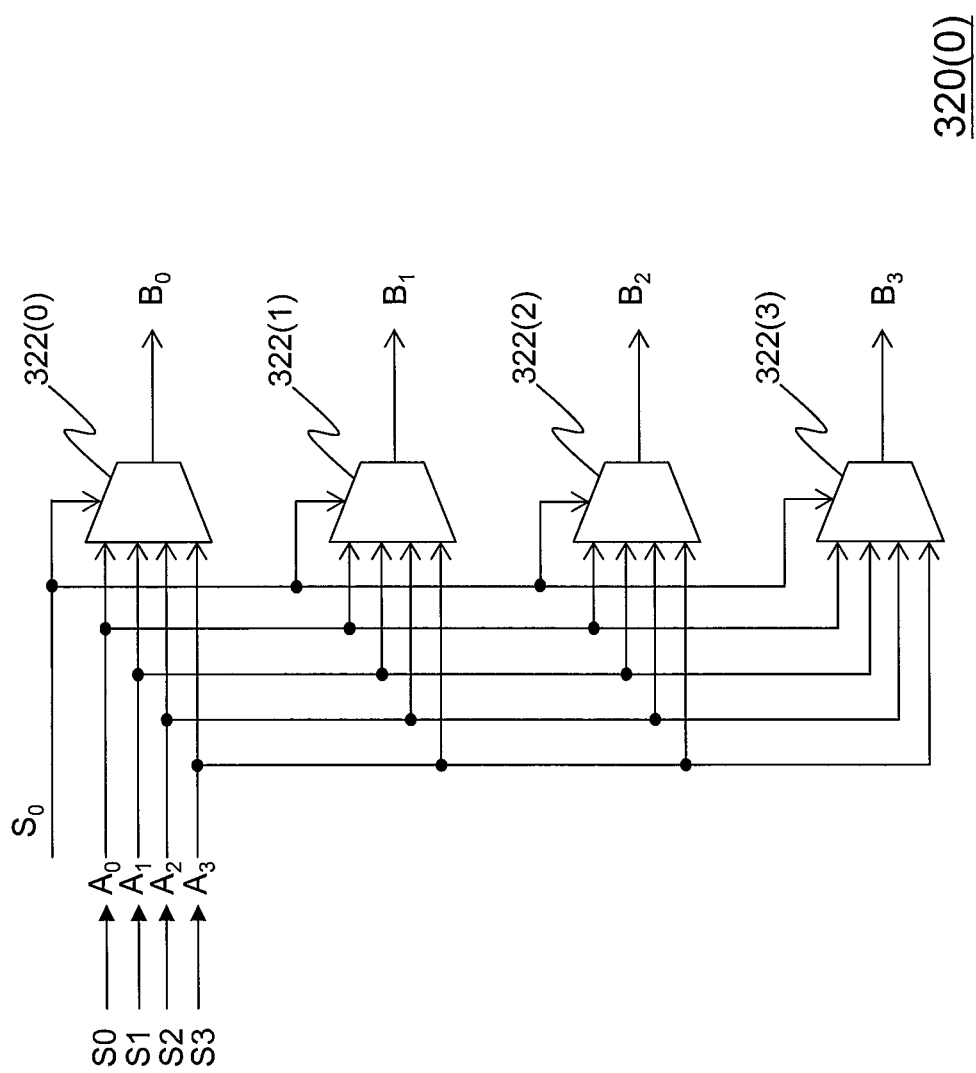
FIG. 4D is a circuit diagram of the sequencer according to an embodiment of the invention.

Referring to FIG. 4D, FIG. 4D is a circuit diagram of a sequencer 320(0) according to an embodiment of the invention. The sequencer 320(0) includes a plurality of multiplexers 322(0)-322(3), the first terminals $A_0$, $A_1$, $A_2$, and $A_3$ of each multiplexer receive signals from the signal channels S0-S3 respectively. Each of the multiplexers 322(0)-322(3) of the sequencer 320(0) selects a signal to output from the signals of four signal channels S0-S3 according to the control signal $S_0$. Wherein, the signals outputted by each of the multiplexers 322(0)-322(3) are different with respect to each other. Therefore, signals coming from the signal channels S0-S3 are reconfigured by the sequencer 320(0), and then outputted through the second terminals $B_0$-$B_3$ of the sequencer 320(0) respectively.

Figure 5:
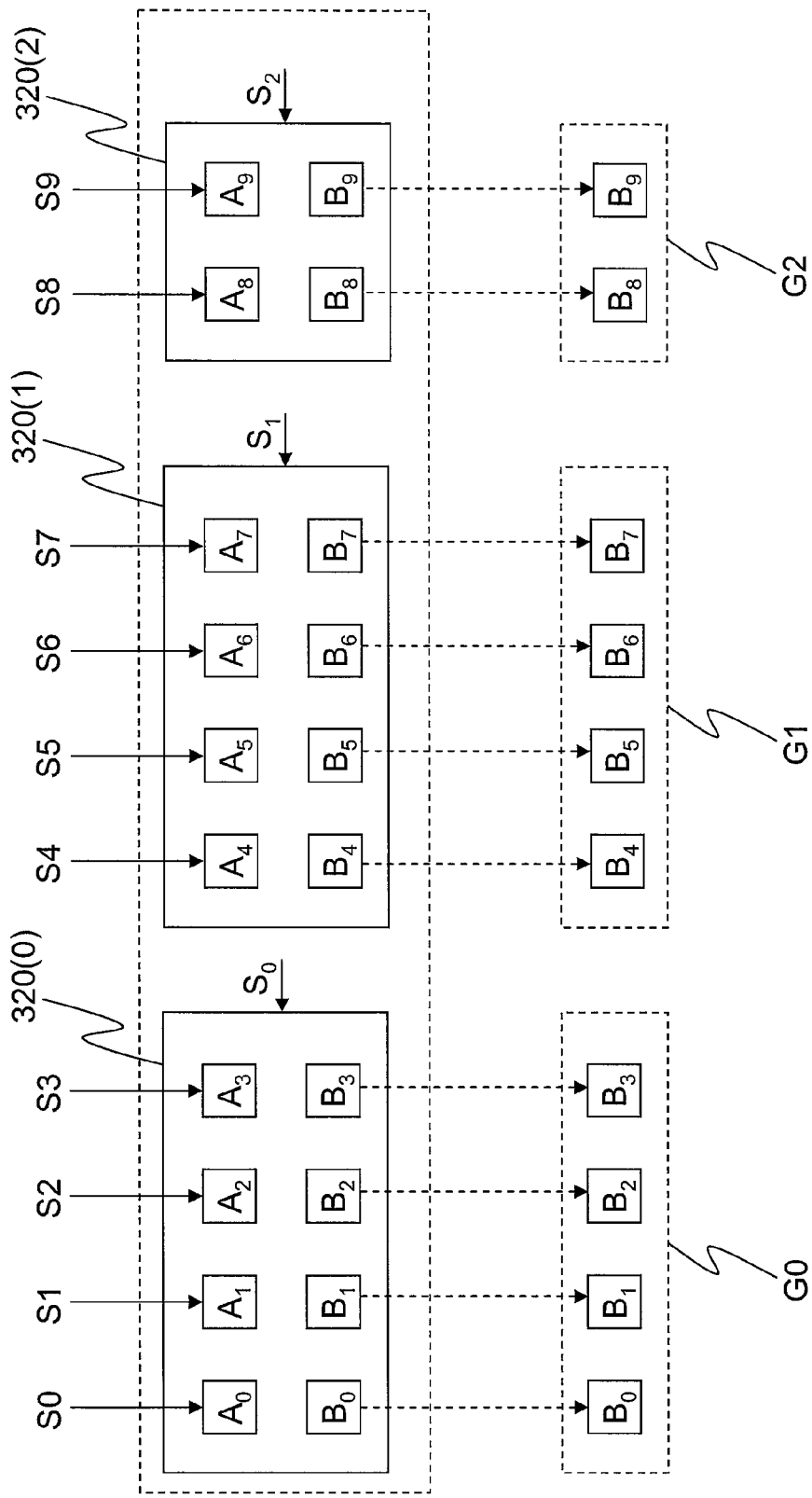
FIG. 5 illustrates how a plurality of sequencers reconfigures the arrangement sequence of the signal channels of a plurality of integrated circuits.

Similar to the sequencer 320(0), the sequencers 320(1) and 320(2) are configured to reconfigure the arrangement sequence of the signal channels S4-S7 and S8-S9 of the integrated circuits IP1 and IP2 respectively. Referring to FIG. 5 and FIG. 3, FIG. 5 illustrates how the sequencers 320(0)-320(2) reconfigure the arrangement sequence of the signal channels S0-S9 of the integrated circuits IP0-IP2. Wherein, the first terminals $A_4$-$A_7$ of the sequencer 320(1) are coupled to the signal channels S4-S7 of the integrated circuit IP1. The signal channels S4-S7 reconfigured by the sequencer 320(1) may be grouped into the same group G1, and the group G1 are represented by the second terminal $B_4$-$B_7$. Similarly, the first terminals $A_8$-$A_9$ of the sequencer 320(2) are coupled to the signal channels S8-S9 of the integrated circuit IP2. The signal channels S8-S9 reconfigured by the sequencer 320(2) may be grouped into the same group G2, and the group G2 are represented by the second terminals $B_8$-$B_9$. Furthermore, in an embodiment of the invention, the sequencers 320(0)-320(2) are controlled by the control signals $S_0$-$S_2$ respectively. The sequencer 320(0) reconfigures the arrangement sequence of the signal channels S0-S3 according to the control signal $S_0$. The sequencer 320(1) reconfigures the arrangement sequence of the signal channels S4-S7 according to the control signal $S_1$. The sequencer 320(2) reconfigures the arrangement sequence of the signal channels S8-S9 according to the control signal $S_2$.

It should be noted that the control signals $S_C$ or $S_0$-$S_2$ may be self-generated by the routing circuit 300, or received by the routing circuit 300 through one or more of the signal terminals $D_0$-$D_{31}$ from outside of the circuit 100. If the control signals $S_C$ or $S_0$-$S_2$ are self-generated by the routing circuit 300, the routing circuit 300 has a register 330 that is configured to store setting data 332, and the routing circuit 300 generates the control signals $S_C$ or $S_0$-$S_2$ according to the setting data 332 stored in the register 330. In an embodiment of the invention, if the routing circuit 300 utilizes one or more of the signal terminals $D_0$-$D_{31}$ to receive the control signals $S_C$ or $S_0$-$S_2$ from outside of the circuit 100, and when the first distributor 410 routes the signal channels S0-S9 to the signal terminals $D_0$-$D_{31}$, the signal terminals that are configured to input the control signals $S_C$ or $S_0$-$S_2$ are skipped by the first distributor 410 without configuration. Furthermore, in an embodiment of the invention, if the routing circuit 300 utilizes one or more signal terminals to receive the control signals $S_C$ or $S_0$-$S_2$ from outside of the circuit 100, the sequencers 320(0)-320(2) and the first distributor 410 will operate respectively after the routing circuit 300 receives the control signals $S_C$ or $S_0$-$S_2$. Wherein, after the completion of inputting the control signals $S_C$ or $S_0$-$S_2$ to the routing circuit 300 by the signal terminals which were configured to input the control signals $S_C$ or $S_0$-$S_2$, the usage right of the signal terminals may be released for first distributor 410 to route, such that all of the signal terminals $D_0$-$D_{31}$ may be routed by the first distributor 410 and connected to the signal channels S0-S9.

Figure 6:
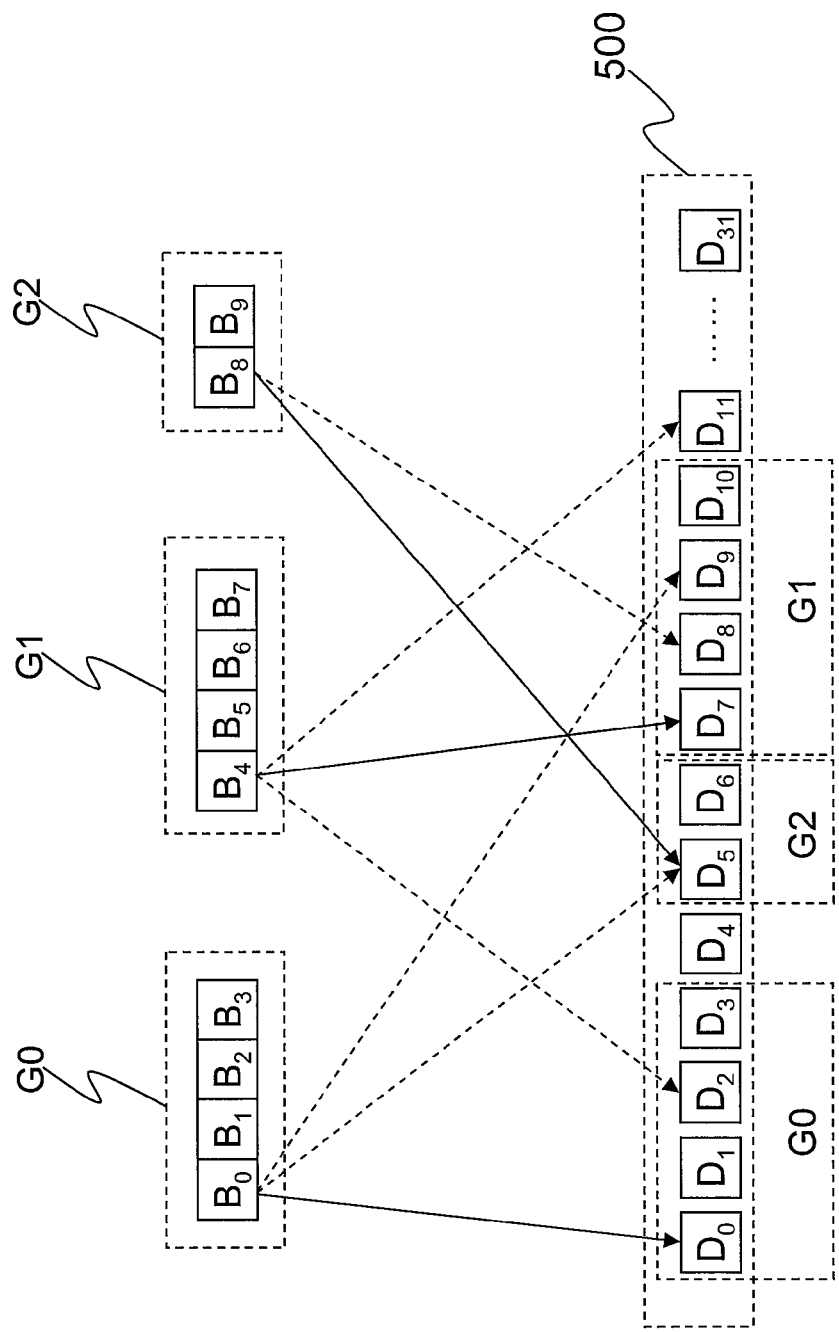
FIG. 6 illustrates how a first distributor routs the signal channels to the signal terminals in group manner.

In an embodiment of the invention, after the signal channels S0-S9 are rearranged by the sequencers 320(0)-320(2), the first distributor 410 routes the signal channels S0-S9 to the signal terminals $D_0$-$D_{31}$ in group manners according to the control signal $S_C$ and base on the reconfigured arrangement sequence of the signal channels S0-S9. Referring to FIG. 6, FIG. 6 illustrates how the first distributor 410 routes the signal channels S0-S9 to the signal terminals $D_0$-$D_{31}$ in group manners. Wherein, the sequencers 320(0)-320(2) group the second terminals $B_0$-$B_9$ into groups G0-G2 respectively, and the second terminals $B_0$-$B_9$ corresponds to the signal channels S0-S9 respectively. Therefore, when the first distributor 410 routes the signal channels S0-S9 to the signal terminals $D_0$-$D_{31}$, the first distributor 410 uses each group as a unit for routing, and routes the groups G0-G2 to the signal terminals $D_0$-$D_{31}$ respectively. In an embodiment of the invention, the first distributor 410 routes a plurality of first of the second terminals $B_0$, $B_4$, or $B_8$ of each groups G0-G2 to the signal terminals $D_0$-$D_{31}$, and routes the remaining second terminals (i.e. $B_1$-$B_3$, $B_5$-$B_7$, or $B_9$) to the signal terminals $D_0$-$D_{31}$ adjacent to the signal terminals, which are routed with the second terminals $B_0$, $B_4$, or $B_8$. By using group G1 as example, the first of the second terminal $B_4$ of the group G1 is routed to the signal terminal $D_7$, and the remaining second terminals $B_5$-$B_7$ of the group G1 are routed to the signal terminals $D_8$-$D_{10}$ that are adjacent to the signal terminal $D_7$ subsequently. The first distributor 410 decides which signal terminal is the first of the second terminal $B_4$ of the group G1 to be routed to. In an embodiment of the invention, the first distributor 410 decides which signal terminal is the first of the second terminal $B_4$ of the group G1 to be routed to according to the control signal $S_C$. Similarly, the first distributor 410 decides which signal terminals $D_0$-$D_{31}$ is the first of the second terminals $B_0$ and $D_8$ of the group G0 and G2 to be routed to according to the control signal $S_C$, and then route the remaining second terminals $B_1$-$B_3$ and $B_9$ of the group G0 and G2 to the adjacent signal terminals. As showing in FIG. 6, in an embodiment of the invention, the second terminals $B_0$-$B_3$ of the group G0 are routed to the signal terminals $D_0$-$D_3$, and the second terminals $B_8$-$B_9$ of the group G2 are routed to the signal terminals $D_5$-$D_6$. Each of the second terminals $B_0$-$B_9$ corresponds to one of the signal channels S0-S9, therefore, the operation of routing the signal channels S0-S9 to the signal terminals $D_0$-$D_{31}$ in group manners are completed after the first distributor 410 routes the groups G0-G2 to the signal terminals $D_0$-$D_{31}$.

Figure 7:
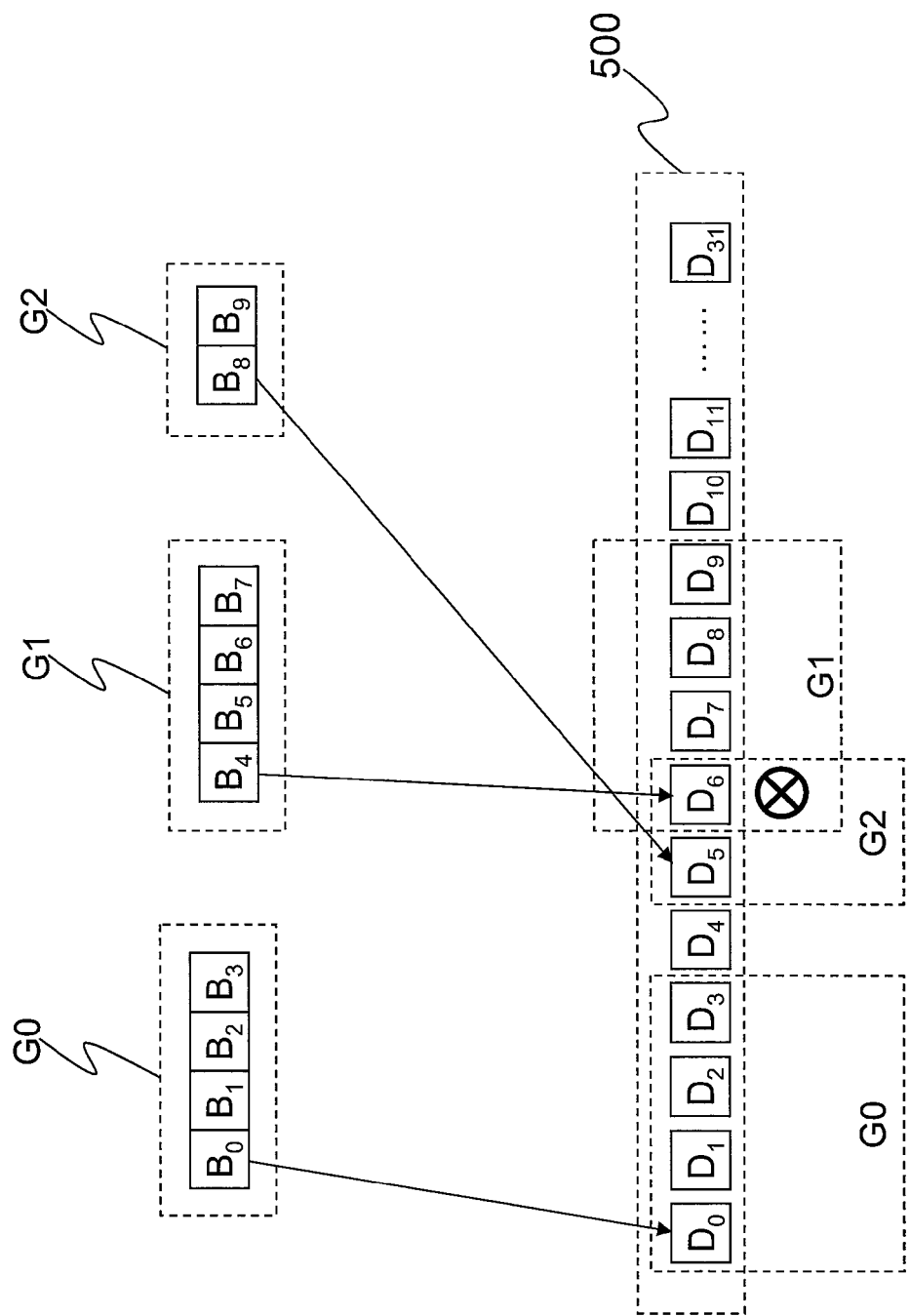
FIG. 7 illustrates a situation where two signal channels are routed to the same signal terminal by the first distributor according to an embodiment of the invention.

After the operation of routing the signal channels S0-S9 to the signal terminals $D_0$-$D_{31}$ by the first distributor 410 in group manners is completed, it is possible for a situation to occur where two or more signal channels are routed to the same signal terminal. Referring to FIG. 7 and FIG. 3, FIG. 7 illustrates a situation where two signal channels are routed to the same signal terminal by the first distributor 410 according to an embodiment of the invention. Wherein the first distributor 410 routes the second terminals $B_4$ and $B_9$ of the groups G1 and G2 to the signal terminal $D_6$. Under such situation, the processing circuit 400 outputs a conflict situation signal $S_E$ to represent which signal terminal of the signal terminals $D_0$-$D_{31}$ is routed with two or more signal channels. By using FIG. 3 and FIG. 7 as example, the conflict situation signal $S_E$ represents that the signal terminal $D_6$ is routed with the signal channels corresponding to two second terminals $B_4$ and $B_9$. Through the warning of the conflict situation signal $S_E$, designers or users of the circuit 100 may be informed with which signal terminals are routed with two or more signal channels. The operation of the routing circuit 300 may be adjusted by changing the control signal $S_C$ and $S_0$-$S_2$ to change the routing situation between the signal channels S0-S9 and signal terminals $D_0$-$D_{31}$.

Figure 8:
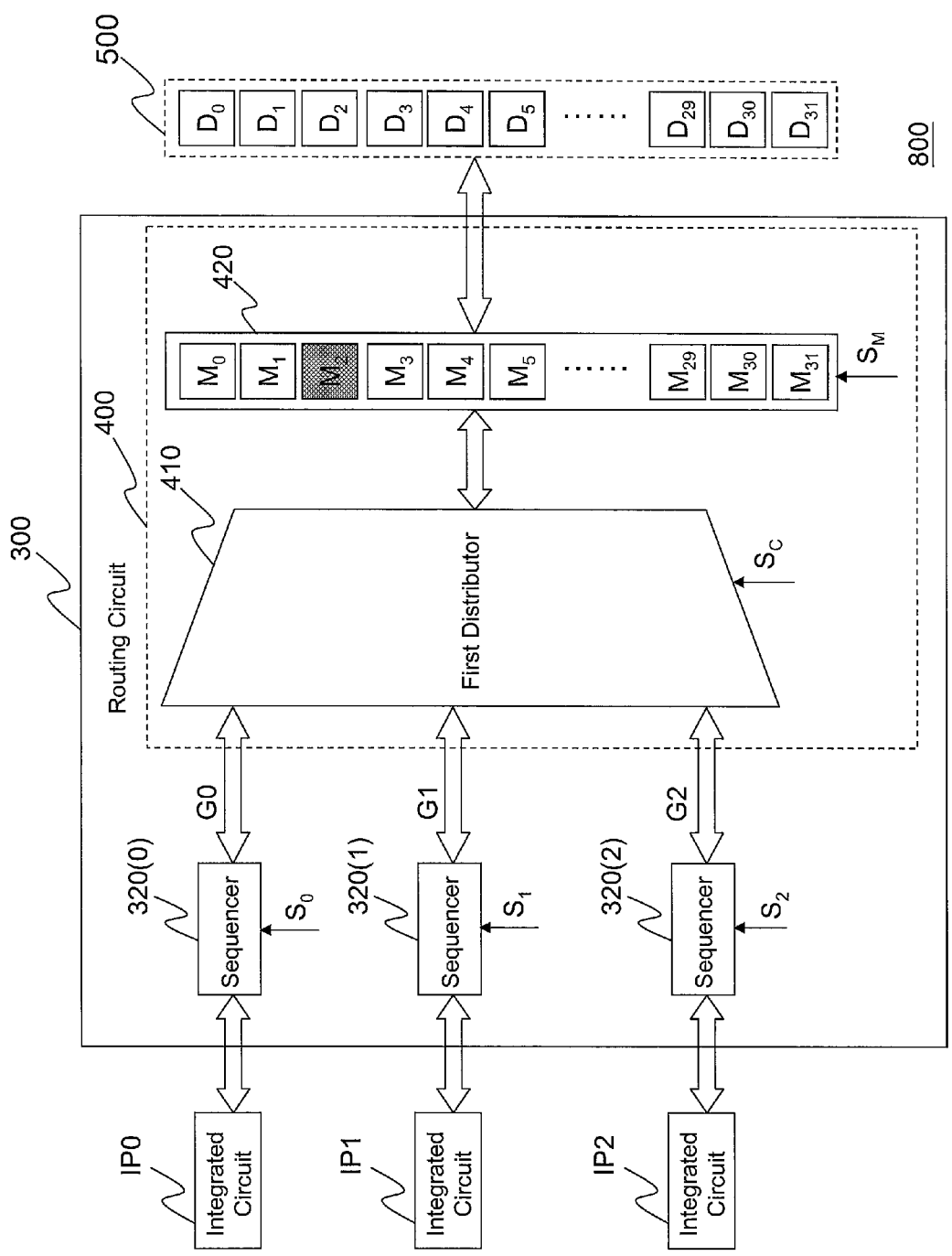
FIG. 8 is a schematic diagram of a circuit of an embodiment of the invention.
Figure 9:
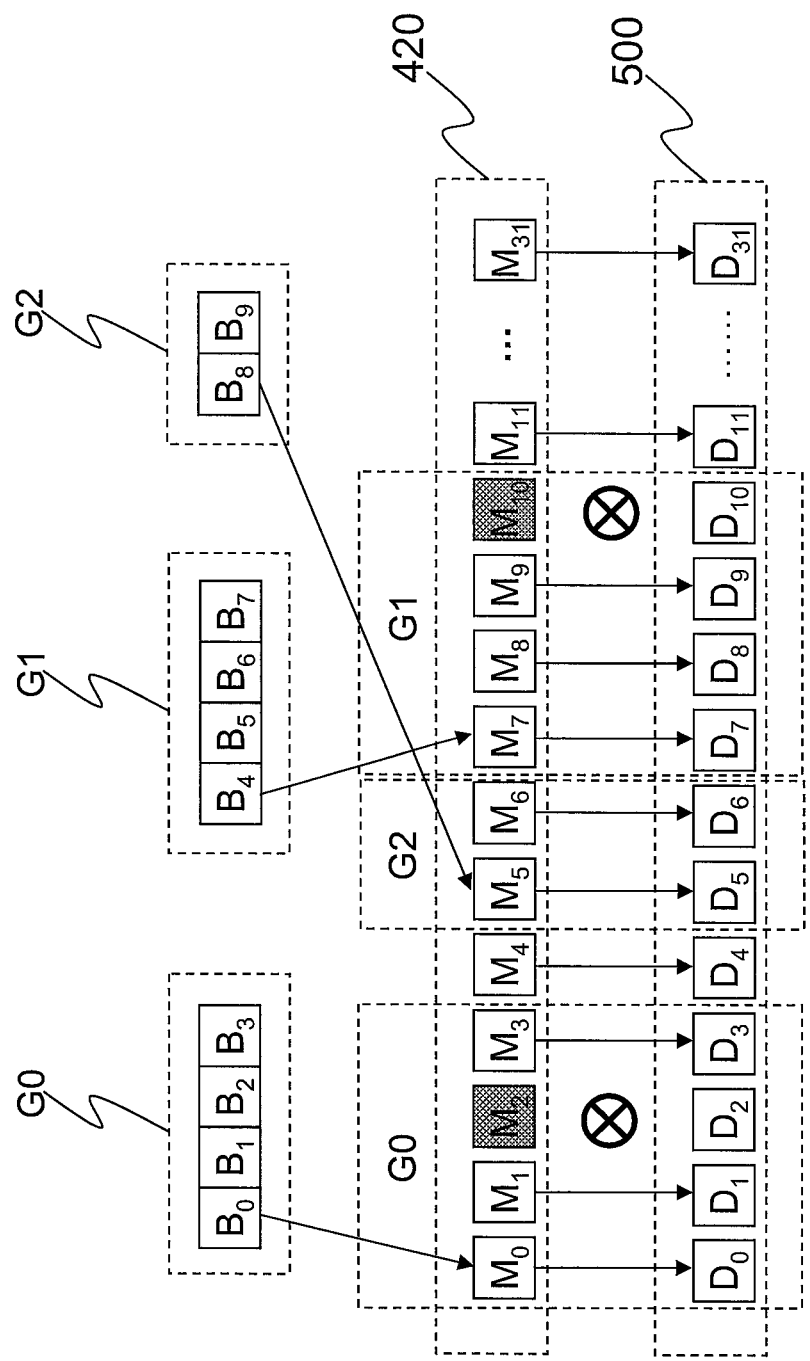
FIG. 9 illustrates how a mask in the FIG. 8 masks connections between some of the signal channels and the signal terminals.

In certain application, part of the signal channels S0-S9 of the integrated circuit IP0-IP2 are unused, the routing circuit 300 utilizes a mask to mask the connection between the unused signal channels and the signal terminals $D_0$-$D_{31}$. Referring to FIG. 8, FIG. 8 is a schematic diagram of the circuit 800 of an embodiment of the invention. The difference between the circuit 800 and the circuit 100 is that the processing circuit 400 of the circuit 800 includes a mask 420. The mask 420 is coupled between the first distributor 410 and the signal terminals $D_0$-$D_{31}$, which is configured to mask the connection between at least one signal channel of the signal channels S0-S9 and the signal terminals $D_0$-$D_{31}$. Referring to FIG. 9 and FIG. 8, FIG. 9 illustrates how the mask 420 in the FIG. 8 masks the connection between some of the signal channels and the signal terminals $D_0$-$D_{31}$. In an embodiment of the invention, the mask 420 has a plurality of masking units $M_0$-$M_{31}$, which are configured to establish or to mask the connection between the signal channels S0-S9 and signal terminals $D_0$-$D_{31}$. Each of the masking units $M_0$-$M_{31}$ corresponds to one of the signal terminals $D_0$-$D_{31}$. In the embodiment of FIG. 9, the masking units $M_2$ and $M_{10}$ of the mask 420 masks the connection between the signal channels corresponding to the second terminals $B_2$ and $B_7$ and the signal terminals $D_0$-$D_{31}$. The remaining masking units $M_0$-$M_1$, $M_3$-$M_9$, and $M_{11}$-$M_{31}$ establish the connection between the signal channels and signal terminals $D_0$-$D_{31}$. As showing in FIG. 9, the masking units $M_2$ and $M_{10}$ corresponds to the second terminals $B_2$ and $B_7$ respectively. Therefore, one signal channel within the signal channels S0-S3 of the integrated circuit IP0 which the second terminal $B_2$ corresponds to is masked and not used, and one signal channel within the signal channels S4-S7 of the integrated circuit IP1 which the second terminal $B_7$ corresponds to is masked and not used.

In an embodiment of the invention, the mask 420 controls the operations of the marking units $M_0$-$M_{31}$ according to a control signal $S_M$. Furthermore, in an embodiment of the invention, each of the marking units $M_0$-$M_{31}$ may be a switch, and turns on or off according to the control signal $S_M$. In addition, in an embodiment of the invention, each of the masking units $M_0$-$M_{31}$ may be a fuse, and maintains present state or blown according to the control signal $S_M$. The masking units $M_0$-$M_{31}$ may be controlled respectively, therefore, the mask 420 may decide whether to mask the connection between at least one signal channel and the signal terminals $D_0$-$D_{31}$. Wherein, the mask 420 is able to unmask every connections between the signal channels S0-S9 and signal terminals $D_0$-$D_{31}$. For example, if all of the masking units $M_0$-$M_{31}$ are switches and all of the masking units $M_0$-$M_{31}$ are turned on and appear to be short-circuited, all of the connections between the signal channels S0-S9 and signal terminals $D_0$-$D_{31}$ are not masked.

Figure 10:
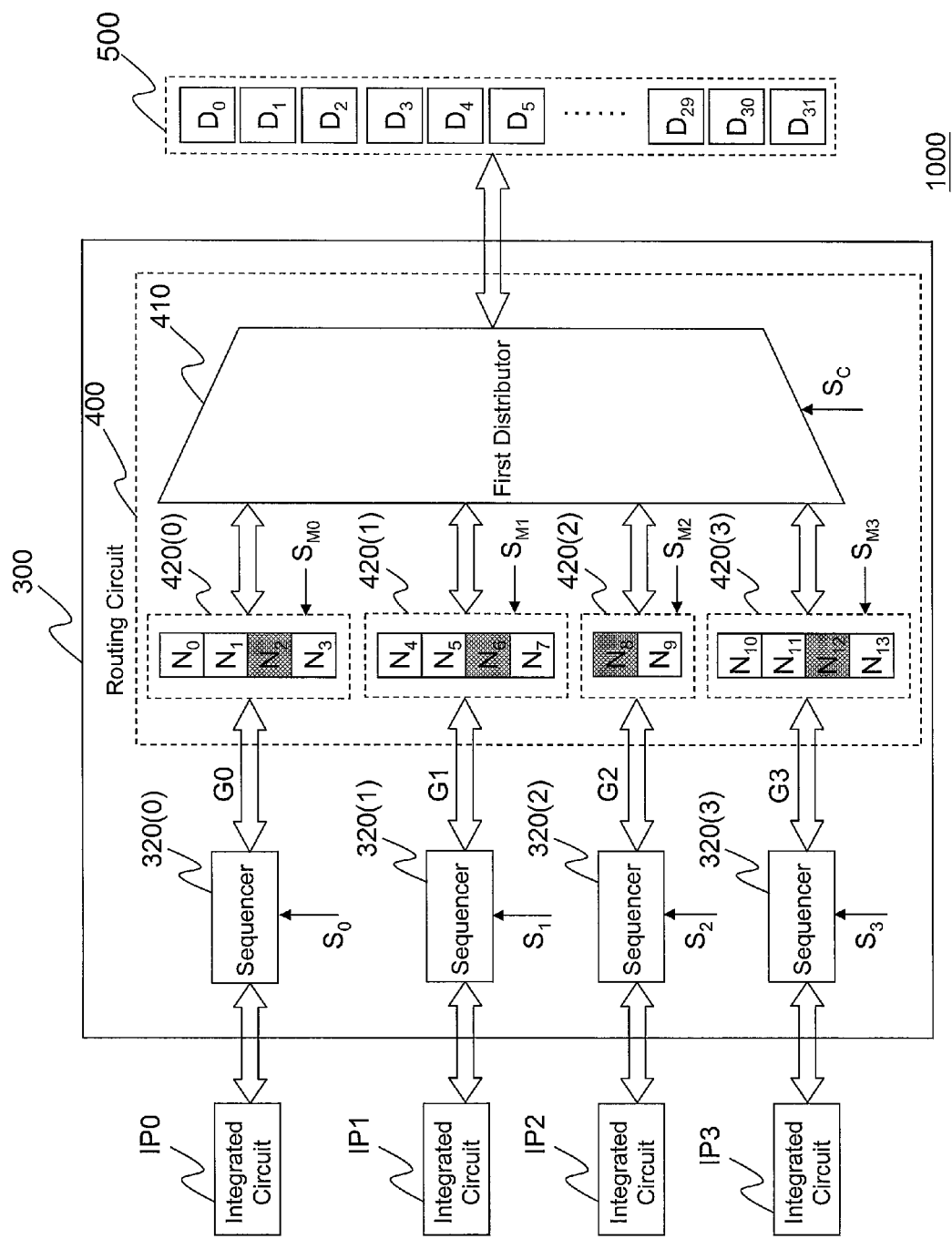
FIG. 10 is a schematic diagram of a circuit according to an embodiment of the invention.
Figure 11:
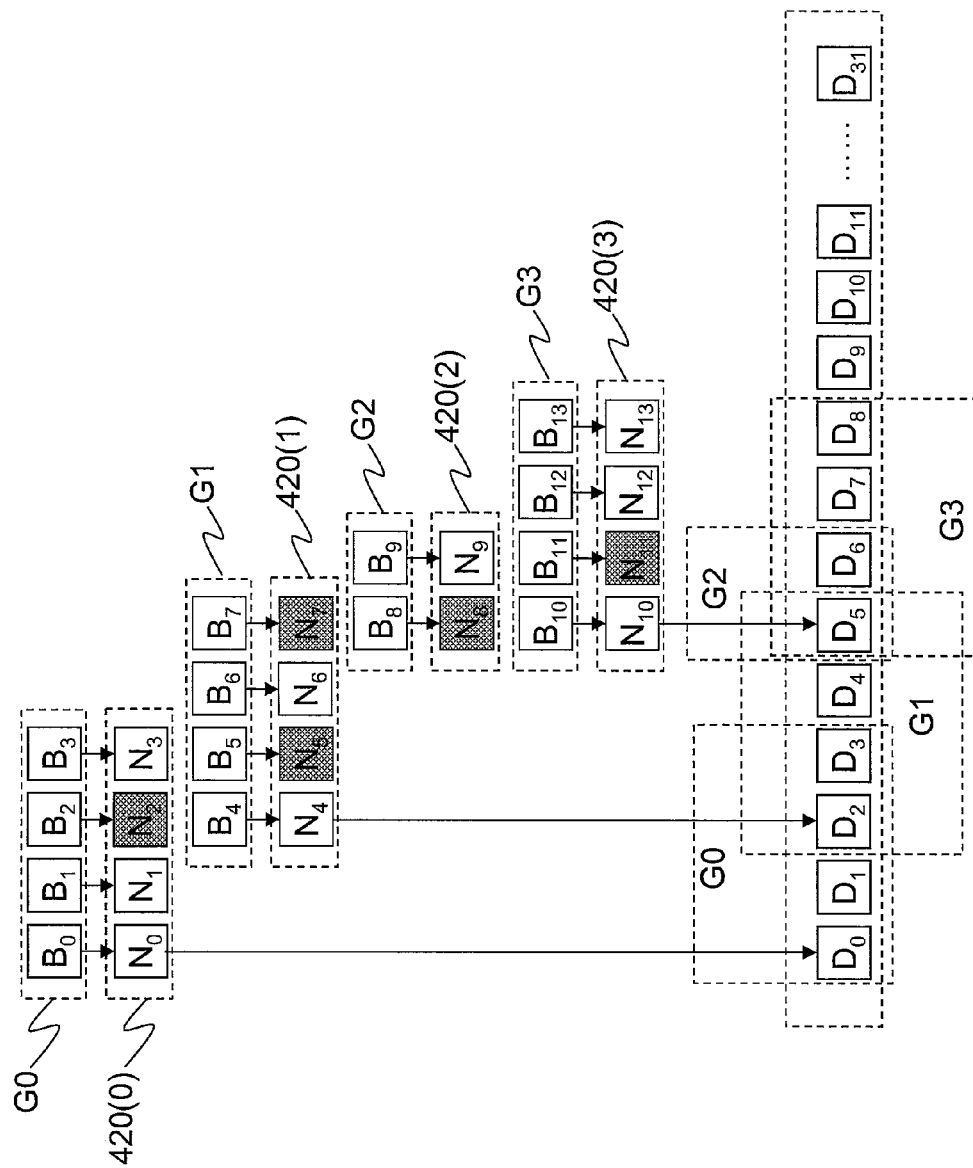
FIG. 11 illustrates how a plurality of masks in the FIG. 10 masks the connections between some of the signal channels and the signal terminals.

In an embodiment of the invention, the processing circuit 400 may further includes a plurality of masks that are coupled between the sequencers and the first distributor. Each mask is configured to decide whether the connection between at least one signal channel of an corresponding integrated circuit and the signal terminals is masked or not. Referring to FIG. 10 and FIG. 11, FIG. 10 is a schematic diagram of a circuit 1000 according to an embodiment of the invention, and FIG. 11 illustrates how the masks 420(0)-420(3) in the FIG. 10 mask the connections between some signal channels and the signal terminals $D_0$-$D_{31}$. The differences between the circuit 1000 and the circuit 100 are that the circuit 1000 further includes an integrated circuit IP3, the routing circuit 300 of the circuit 1000 further includes a sequencer 320(3), and the processing circuit 400 of the circuit 1000 further includes a plurality of masks 420(0)-420(3). The sequencer 320(3) is coupled to the integrated circuit IP3, and is configured to reconfigure the arrangement sequence of the signal channels of the integrated circuit IP3. The masks 420(0)-420(3) are coupled between the sequencers 320(0)-320(3) and the first distributor 410. Each of the masks 420(0)-420(3) is configured to decide whether to mask the connection between at least one signal channel of the corresponding integrated circuit IP0~IP3 and the signal terminals $D_0$-$D_{31}$. In an embodiment of the invention, each of the masks 420(0)-420(3) has a plurality of masking units $N_0$-$N_3$, $N_4$-$N_7$, $N_8$-$N_9$, or $N_{10}$-$N_{13}$, which are configured to establish or mask the connections between the signal channels of the integrated circuit IP0~IP3 and the signal terminals $D_0$-$D_{31}$. Each of the masking units $N_0$-$N_{13}$ corresponds to one of the second terminals $B_0$-$B_{13}$.

In the embodiment in the FIG. 10 and FIG. 11, the masking unit $N_2$ of the masks 420(0) masks the connection between the signal channel which the second terminal $B_2$ corresponds to and the signal terminals $D_0$-$D_{31}$, and the remaining masking units $N_0$, $N_1$, and $N_3$ of the mask 420(0) establish the connections between the signal channels which the second terminals $B_0$, $B_1$, and $B_3$ correspond to and the signal terminals $D_0$-$D_{31}$. Similarly, the masking units $N_5$, $N_7$, $N_8$, and $N_{11}$ of the masks 410(0)-420 (3) mask the connections between the signal terminals which the second terminals $B_5$, $B_7$, $B_8$, and $B_{11}$ correspond to and the signal terminals $D_0$-$D_{31}$. The remaining masking units $N_4$, $N_6$, $N_9$, $N_{10}$, $N_{12}$, and $N_{13}$ of the masks 420(1)-420(3) establish the connections between the signal channels which the second terminals $B_4$, $B_6$, $B_9$, $B_{10}$, $B_{12}$, and $B_{13}$ correspond to and the signal terminals $D_0$-$D_{31}$. In the present embodiment, the signal channels which the second terminals $B_2$, $B_5$, $B_7$, $B_8$, and $B_{11}$ correspond to are masked and not used.

Furthermore, the signal channels which the second terminals $B_2$, $B_5$, $B_7$, $B_8$, and $B_{11}$ correspond to are masked and not used, therefore, the first distributor 410 may route the signal channels that are not masked to the signal terminals $D_0$-$D_{31}$ according to the condition of each masking units $N_0$-$N_{13}$. As showing in FIG. 11, the second terminals $B_0$, $B_1$, and $B_3$ of the group G0 are routed to signal terminals $D_0$, $D_1$, and $D_3$ respectively. Wherein, the signal terminal $D_2$ is not routed to the second terminal $B_2$ and the second terminal $B_5$ of the group G1 is masked, so the second terminal $B_4$ of the group G1 may be routed to the signal terminal $D_2$. Under such situation, the second terminal $B_6$ of the group G1 is routed to the signal terminal $D_4$. Similarly, the second terminal $B_9$ of the group G2 is routed to the signal terminal $D_6$, and the second terminals $B_{10}$, $B_{12}$, and $B_{13}$ of the group G3 are routed to the signal terminals $D_5$, $D_7$, and $D_8$ respectively. Because the first distributor 410 uses each group as a unit for routing the signal channels corresponded to the groups G0-G3 to the signal terminals $D_0$-$D_{31}$, the signal terminals which the groups G0-G3 are routed to may be interlaced with each other when some of the signal channels are masked by the masking units N0-N13.

In an embodiment of the invention, the masks 420(0)-420(3) may control the operation of each masking units $N_0$-$N_{13}$ according to a plurality of control signals $S_{M0}$-$S_{M3}$ respectively. In addition, in an embodiment of the invention, each of the masking units may be a switch which may be turned on or off according to the control signals $S_{M0}$-$S_{M3}$. Furthermore, in an embodiment of the invention, each of the masking units $N_0$-$N_{13}$ may be a fuse which may maintain present situation or blown according to the control signals $S_{M0}$-$S_{M3}$. The masking units N0-N13 may be controlled respectively, therefore, each of the masks 420(0)-420(3) may decide whether to mask the connection between at least one signal channel of the integrated circuits which the masks 420(0)-420(3) correspond to and the signal terminals $D_0$-$D_{31}$. Wherein, the masks 420(0)-420(3) may allow the connection between each signal channel of the integrated circuits IP0-IP3 and the signal terminals D0-D31 to be un-masked.

Figure 12:
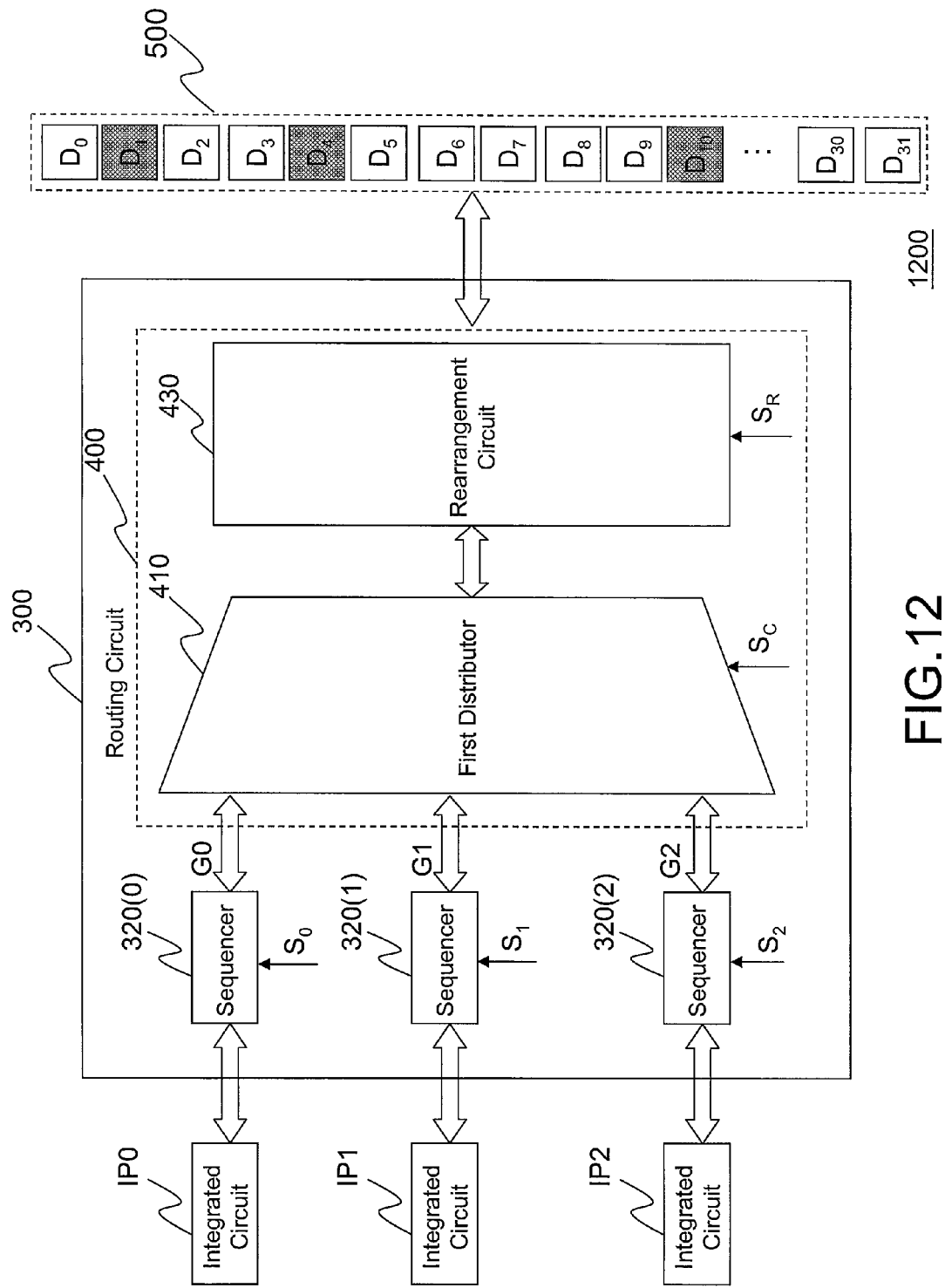
FIG. 12 is a schematic diagram of a circuit of an embodiment of the invention.

In the part of applications, the signal terminals $D_0$-$D_{31}$ are not all utilized. Under such situation, a rearrangement circuit 430 sets which signal terminals of the signal terminals $D_0$-$D_{31}$ are usable. Referring to FIG. 12, FIG. 12 is a schematic diagram of a circuit 1200 of an embodiment of the invention. The difference between circuit 1200 and circuit 100 is that the processing circuit 400 of the circuit 1200 further includes the rearrangement circuit 430. The rearrangement circuit 430 is coupled between the first distributor 410 and signal terminals $D_0$-$D_{31}$ and configured to set which signal terminals within the signal terminals $D_0$-$D_{31}$ are usable. The first distributor 410 routes the signal channels to the usable signal terminals. By using FIG. 12 as example, in the present embodiment, the rearrangement circuit 430 sets the signal terminals $D_1$, $D_4$, and $D_{10}$ to be unusable signal terminals, so the first distributor 410 routes the signal channels S0-S9 to the usable terminals $D_0$, $D_2$-$D_3$, $D_5$-$D_9$, and $D_{11}$-$D_{31}$.

Figure 13:
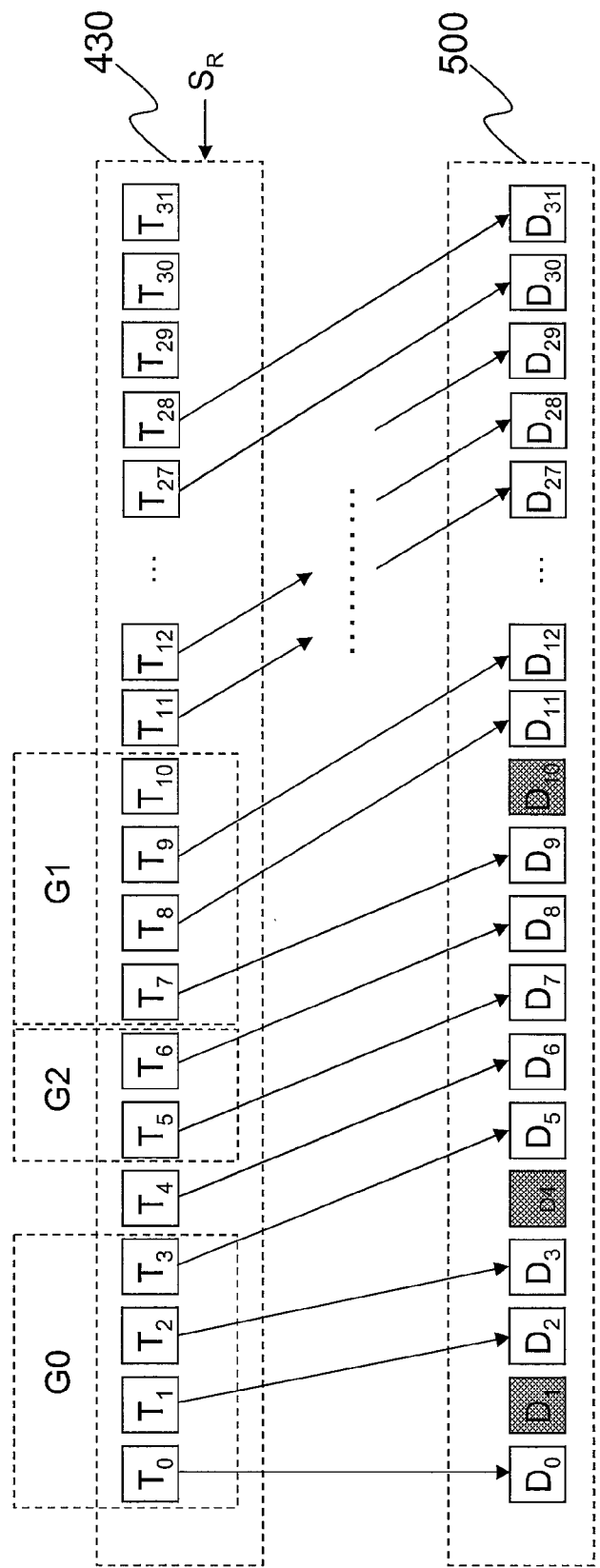
FIG. 13 is a diagram of a rearrangement circuit and an output interface of an embodiment of the invention.

Referring to FIG. 13, FIG. 13 is a diagram of the rearrangement circuit 430 and the output interface 500 of an embodiment of the invention. In the embodiment, the arrangement circuit 430 includes a plurality of pointing units $T_0$-$T_{31}$. When the first distributor 410 routes the signal channels S0-S9, the signal channels S0-S9 are routed to some of the pointing units $T_0$-$T_{31}$. The pointing units $T_0$-$T_{31}$ will redirect the routing coming from the first distributor 410 to the corresponding signal terminals $D_0$-$D_{31}$ according to the control signal $S_R$. Wherein, the signal terminals $D_1$, $D_4$, and $D_{10}$ are set to be unusable signal terminals. Therefore, through the routing of the first distributor 410 and the redirection of the pointing units $T_0$-$T_{31}$, the signal channels S0-S9 are configured to part of the signal terminals of the signal terminals $D_0$, $D_2$-$D_3$, $D_5$-$D_9$, and $D_{11}$-$D_{31}$. Wherein, the signal terminals $D_1$, $D_4$, and $D_{10}$ are ignored without routing.

Figure 14:
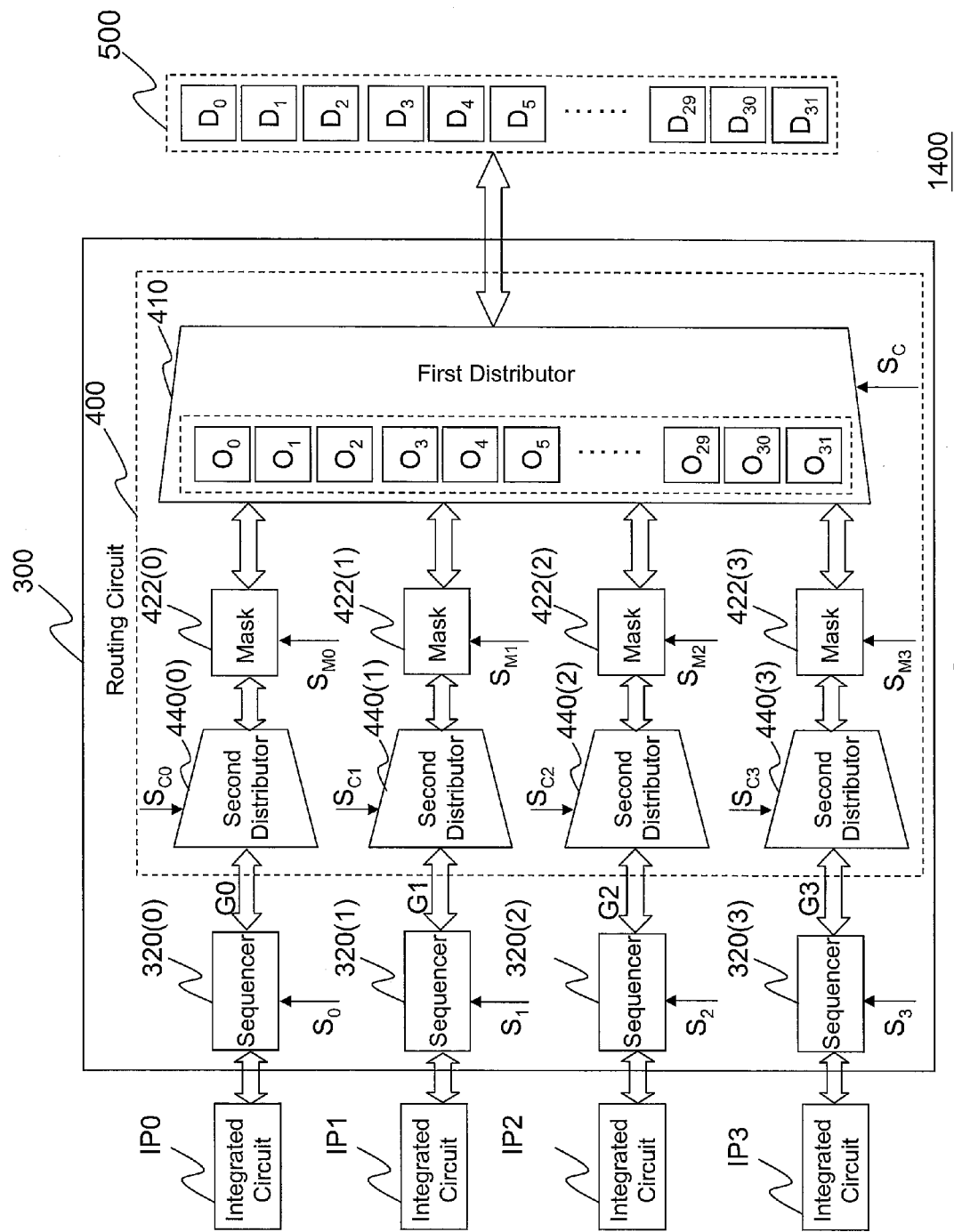
FIG. 14 is a schematic diagram of a circuit of an embodiment of the invention.

Referring to FIG. 14, FIG. 14 is a schematic diagram of a circuit 1400 of an embodiment of the invention. The difference between the circuit 1400 and the circuit 1000 is that the circuit 1400 further includes a plurality of second distributors 440(0)-440(3), and a plurality of masks 422(0)-422(3) replaces the masks 420(0)-420(3). The second distributors 440(0)-440(3) are coupled between the sequencers 320(0)-320(3) and the masks 422(0)-422(3). Each of the second distributors 440(0)-440(3) are configured to distribute the signal channels of a corresponding integrated circuit of the integrated circuits IP0-IP3 to a plurality of distribution units $O_0$-$O_{31}$. Wherein, each of the distribution units $O_0$-$O_{31}$ is coupled to a corresponding one of the signal terminals $D_0$-$D_{31}$. The masks 422(0)-422(3) are configured to establish or to mask the connections between a plurality of output terminals of the second distributors and the distribution units $O_0$-$O_{31}$.

Figure 15:
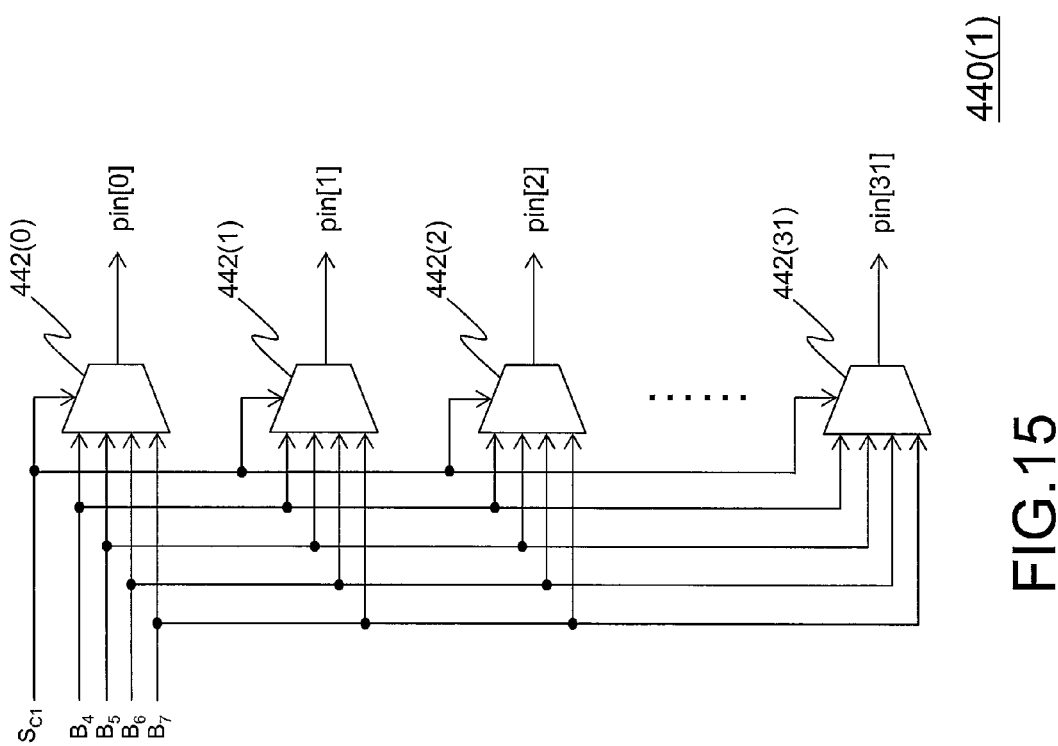
FIG. 15 illustrates the operation of a plurality of second distributors in the FIG. 14.

Referring to FIG. 15, FIG. 15 illustrates the operation of the second distributor 440(1) in the FIG. 14. The second distributor 440(1) includes a plurality of multiplexers 442(0)-442(31) which are coupled to the second terminals $B_4$-$B_7$ of the corresponding group G1. The multiplexers 442(0)-442(31) decides whether to output signals coming from the second terminals $B_4$-$B_7$ through the output terminals pin[0]-pin[31] of the multiplexers 442(0)-442(31) according to the control signal $S_{C1}$. It should be noted that the number of the input terminals of each of the multiplexers 442(0)-442(31) are equal to or greater than the number of the second terminals of the corresponding group. By using the second distributor 440(2) as example, the second distributor 440(2) corresponds to the group G2, and the number of the second terminals of the group G2 is two. Therefore, the number of the input terminal of each multiplexer of the second distributor 440(2) must be at least two. Furthermore, in an embodiment of the invention, the second distributors 440(0), 440(2), and 440(3) have the same architecture as the second distributor 440(1).

Figure 16:
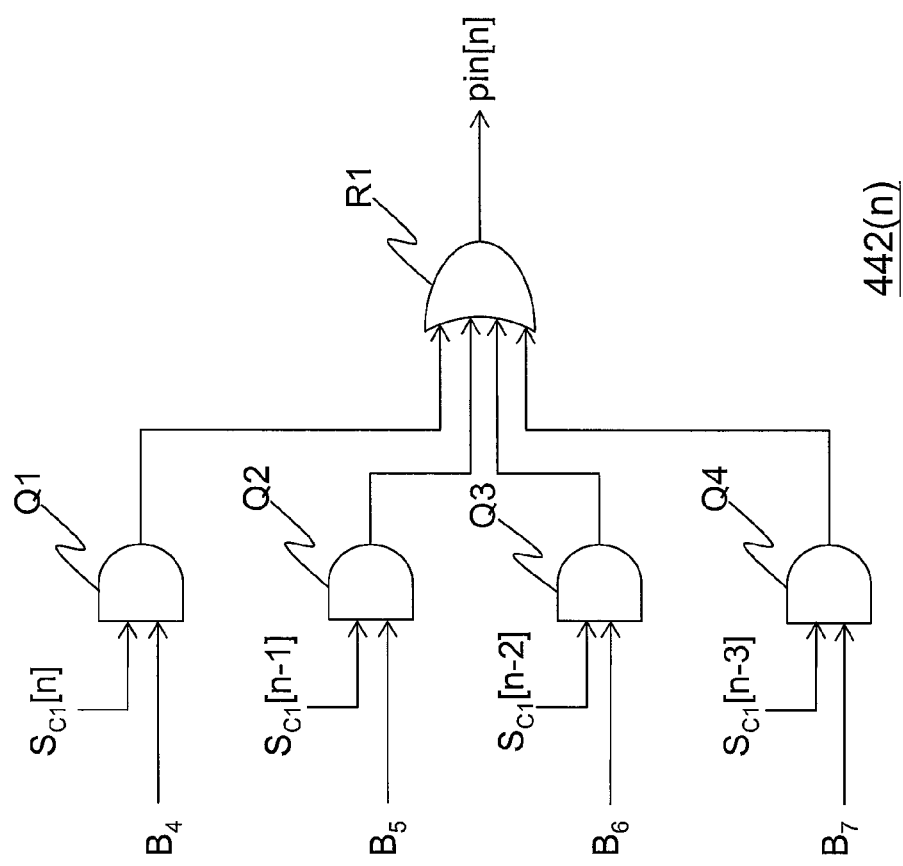
FIG. 16 is a circuit diagram of a plurality of multiplexers of the second distributors according to an embodiment of the invention.

Referring to FIG. 16, FIG. 16 is a circuit diagram of the multiplexers 440(n) of the second distributor 440(1) according to an embodiment of the invention. A variable n is an integer, and the maximum value of n can be equal to the number of the signal terminals $D_0$-$D_{31}$ of the output interface 500. Therefore, in the present embodiment, the variable n can be greater than or equal to 0, and less than or equal to 31 ($0 \leq n \leq 31$). The multiplexers 442(n) include a plurality of AND gates Q1-Q4 and an OR gate R1. Each of the AND gates Q1-Q4 is coupled to one of the corresponding second terminals $B_4$-$B_7$, and receives a corresponding bit of the control signal $S_{C1}$ to perform a AND operation. In the embodiment, the control signal $S_{C1}$ is a 32-bit control signal, and only one bit out of 32 bits is 1 and the values of the remaining bits are 0. Wherein a bit with a value of 1 is configured to represent which of the distribution units $O_0$-$O_{31}$ is the first of the second terminal $B_4$ of the group G1 distributed to. For example, assuming the value of the sixteenth bit $S_{C1}[15]$ of the control signal $S_{C1}$ is 1, then the second terminal $B_4$ is distributed to the sixteenth distribution unit $O_{15}$ of the distribution units $O_0$-$O_{31}$. The OR gate R1 performs an OR operation on the outputs of the AND gates Q1-Q4, and outputs the corresponding signal from the output terminal pin[n] of the OR gates. It should be noted that the AND gates Q1-Q4 receive bits $S_{C1}[n]$-$S_{C1}[n-3]$ of the control signal $S_{C1}$ respectively. Wherein, if (n-1), (n-2), or (n-3) are less than 0, the values of the corresponding bits $S_{C1}[n-1]$, $S_{C1}[n-2]$, or $S_{C1}[n-3]$ are 0.

Figure 17:
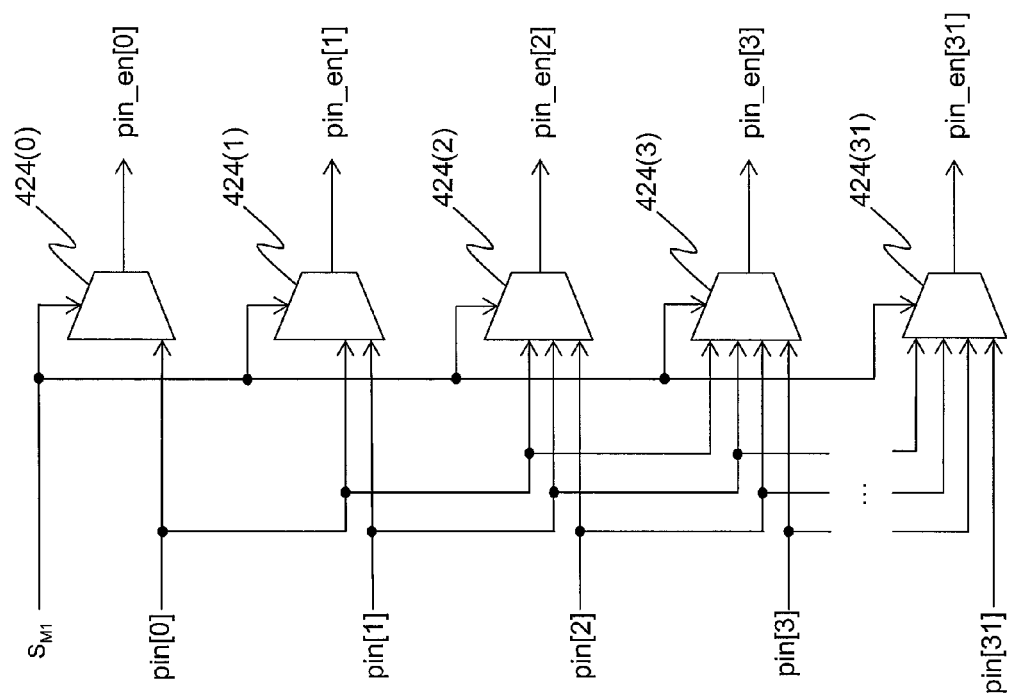
FIG. 17 illustrates the operation of the mask in the FIG. 14.

Referring to FIG. 17, FIG. 17 illustrates the operation of the mask 422(1) in the FIG. 14. The mask 422(1) includes a plurality of multiplexers 424(0)-424(31) and are coupled to a plurality of output terminals pin[0]-pin[31]. Each of the multiplexers 424(0)-424(31) is coupled to one or plurality of output terminals pin[0]-pin [31] showing in the FIG. 17.

Each of the multiplexers 424(0)-424(31) decides whether to output signals of the output terminals pin_en[0]-pin_en[31] according to a control signal $S_{M1}$. Wherein, each of the output terminals pin_en[0]-pin_en[31] is coupled to a corresponding distribution unit of the distribution units $O_0$-$O_{31}$. In an embodiment of the invention, the masks 422(0), 422(2), and 422(3) have the same architecture as the second distributor 440(1).

Figure 18:
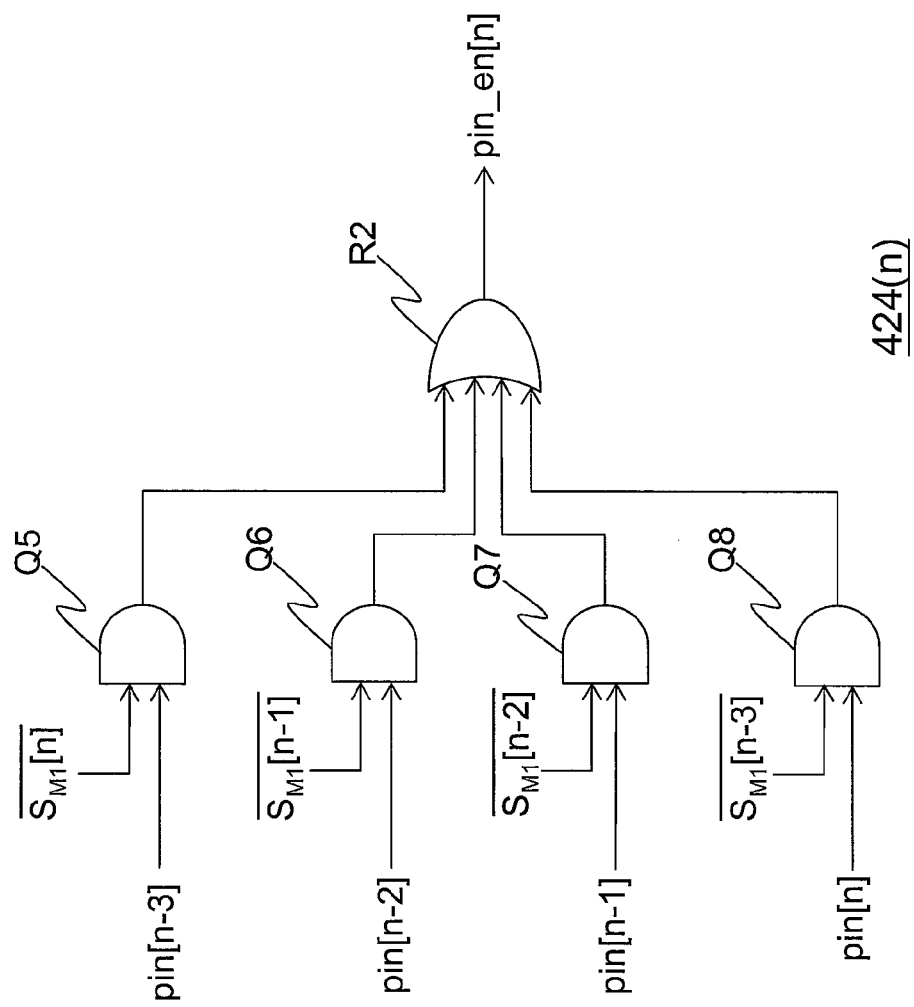
FIG. 18 is a circuit diagram of the multiplexers of the masks.

Referring to FIG. 18, FIG. 18 is a circuit diagram of the multiplexers 424(n) of the masks 422(1). A variable n is an integer, and the maximum value of n is equal to the number of the signal terminals $D_0$-$D_{31}$ of the output interface 500. Therefore, in the embodiment, variable n is greater than or equal to 0, and less than or equal to 31 (0≤n≤31). The multiplexer 442(n) includes a plurality of AND gates Q5-Q8 and an OR gate R2. Each of the AND gates Q5-Q8 is coupled to one of the output terminals pin_en[0]-pin_en[31], and receives a corresponding bit of the control signal $S_{M1}$ to perform the AND operation. In the embodiment, the control signal $S_{M1}$ is a 32-bit control signal, and the connections between the signal channels S1-S9 and the distribution units $O_0$-$O_{31}$ corresponding to the bits of the control signal $S_{M1}$ that have values of 1 are masked. The connections between the signal channels S1-S9 and the distribution units $O_0$-$O_{31}$ corresponding to the bits of the control signal $S_{M1}$ that have values of 0 are not masked. For example, assuming the value of the fifth bit $S_{M1}[5]$ and nineteenth bit $S_{M1}[19]$ of the control signal $S_{M1}$ are 1, then the connections between the fifth and nineteenth distribution units $O_4$ and $O_{18}$ and the signal channels S1-S9 are masked. The OR gate R2 performs the OR operation on the outputs of the AND gates Q5-Q8, and outputs the corresponding signal from the output terminal pin[n] of the OR gate. It should be noted that each bit of the control signal $S_{M1}$ goes through a phase inverting process first and then inputs to the AND gates Q5-Q8. As shown in FIG. 18, each of the AND gates Q5-Q8 receives one of the inverted bits $\overline{S_{M1}[n]}$ to $\overline{S_{M1}[n-3]}$ of the control signal $S_{M1}$ respectively. Wherein if (n-1), (n-2), or (n-3) is less than 0, the value of the corresponding bit $S_{C1}[n-1]$, $S_{C1}[n-2]$, or $S_{C1}[n-3]$ is 1.

Figure 19:
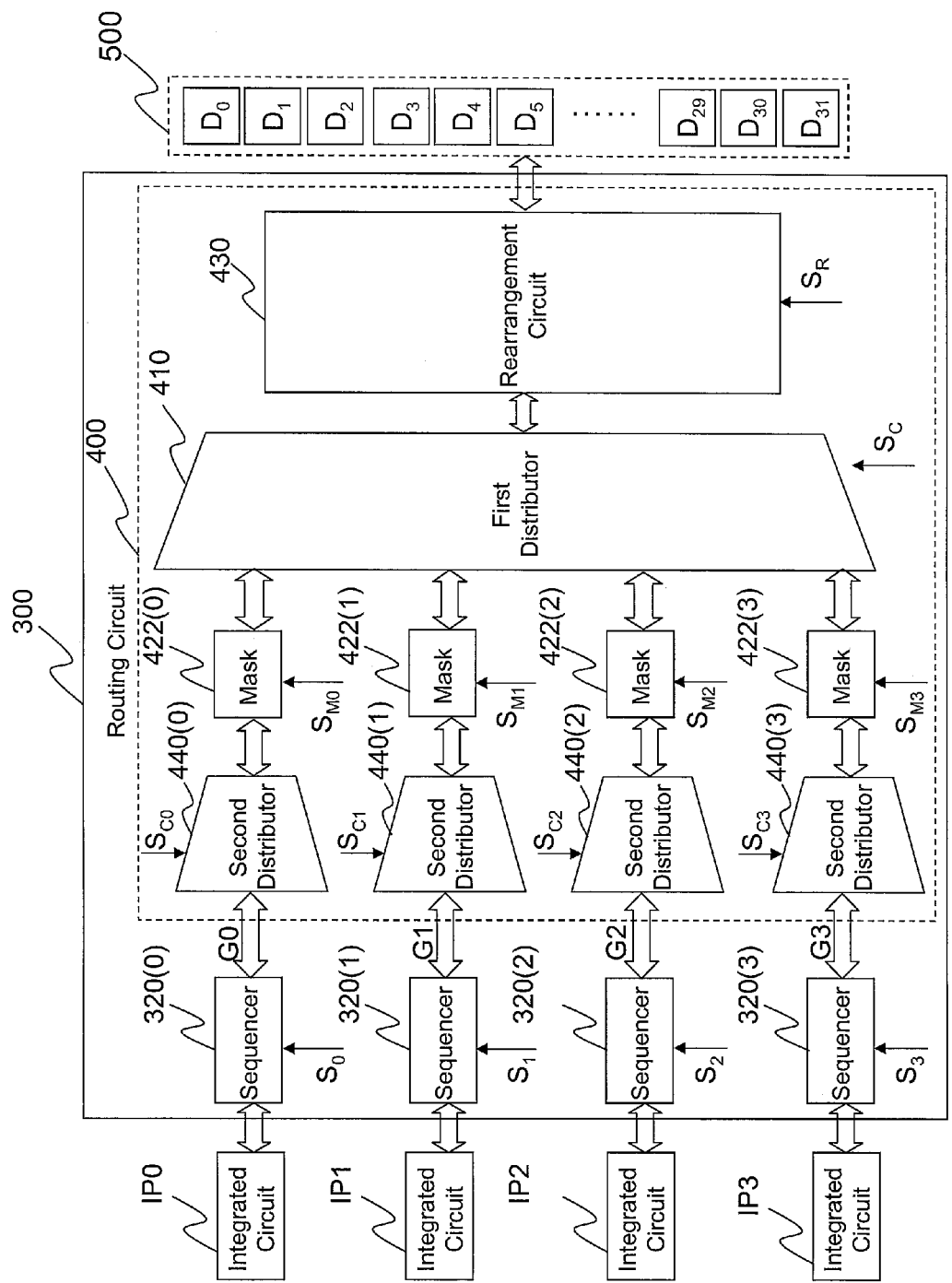
FIG. 19 is a schematic diagram of a circuit according to an embodiment of the invention.

Referring to FIG. 19, FIG. 19 is a schematic diagram of a circuit 1900 according to an embodiment of the invention. The difference between the circuit 1900 and the circuit 1400 is that the circuit 1900 further includes the rearrangement circuit 430 which is coupled between the first distributor 410 and signal terminals D0-D31. The rearrangement circuit 430 is configured to configure which signal terminals of the signal terminals D0-D31 are usable. The function of the rearrangement circuit 430 of the circuit 1900 is identical to the rearrangement circuit 430 in FIG. 12, hence it is not repeated here.

In summary, the routing circuit of the embodiments of the invention has the capability to adaptively route the signal channels of the integrated circuits to the signal terminals in group manners. Therefore, the signal terminals of the integrated circuit may be routed to the suitable signal terminals according to the practical needs of the applications. Hence, the application convenience of the integrated circuit is enhanced.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A routing circuit, configured to route a plurality of signal channels of a plurality of integrated circuits to a plurality of signal terminals, the routing circuit comprising:
   a plurality of sequencers, each of the sequencers is coupled to the signal channels of a corresponding one of the integrated circuits to reconfigure an arrangement sequence of the coupled signal channels; and
   a processing circuit, coupled between the sequencers and the signal terminals, the processing circuit comprising:
   a first distributor, configured to route the signal channels to the signal terminals in a group manner according to a control signal and based on the arrangement sequences of the signal channels of the integrated circuits reconfigured by the sequencers,
   wherein, each of the signal channels is routed to one of the signal terminals simultaneously, each of the signal terminals is a pin of the package, and a different control signal corresponds to a different arrangement sequence of the signal channels,
   wherein when the processing circuit routes at least two signal channels of the signal channels to a single signal terminal of the signal terminals, the processing circuit outputs a conflict situation signal to inform a user to change the routing situation between the signal channels and signal terminals, wherein the conflict situation signal represents which signal terminal of the signal terminals is routed with the at least two signal channels.

2. The routing circuit as claimed in claim 1, wherein the processing circuit further comprises a mask, coupled between the first distributor and the signal terminals, configured to decide whether to mask the connection between at least one signal channel of the signal channels and the signal terminals.

3. The routing circuit as claimed in claim 1, wherein the processing circuit further comprises a plurality of masks, coupled between the sequencers and the first distributor, each of the masks is configured to decide whether to mask the connection between at least one signal channel of a corresponding one of the integrated circuits and the signal terminals.

4. The routing circuit as claimed in claim 3, wherein the processing circuit further comprises a plurality of second distributors, coupled between the sequencers and the masks, and each of the second distributors is configured to distribute a plurality of signal terminals of a corresponding one of the integrated circuits to a plurality of distribution units of the first distributor.

5. The routing circuit as claimed in claim 1, wherein the processing circuit further comprises: a rearrangement circuit, coupled between the first distributor and the signal terminals, configured to determine which signal terminals are utilized, and the first distributor routes the signal channels to the utilized signal terminals.

6. The routing circuit as claimed in claim 1, wherein the routing circuit and the integrated circuits are packaged in a package, the signal channels of the same integrated circuit are routed to the signal terminals of the same group, and the signal terminals of the same group are adjacent to each other.

7. The routing circuit as claimed in claim 6, wherein a corresponding relationship of the signal channels and the signal terminals routed to in the same group change according to the control signal.

8. The routing circuit as claimed in claim 6, wherein the pins of the same group are located on a same side of a geometrical shape of the package.

9. The routing circuit as claimed in claim 1, wherein the routing circuit and the integrated circuits are disposed on a chip.

10. A circuit, comprising:
- a plurality of integrated circuits, each of the integrated circuits has a plurality of signal channels;
- a plurality of signal terminals; and
- a routing circuit, coupled between the integrated circuits and the signal terminals, configured to route the signal channels of the integrated circuits to the signal terminals, the routing circuit comprising:
- a plurality of sequencers, each of the sequencers is coupled to the signal channels of a corresponding one of the integrated circuits to reconfigure an arrangement sequence of the coupled signal channels; and
- a processing circuit, coupled to the sequencers, the processing circuit comprising:
- a first distributor, configured to route the signal channels to the signal terminals in a group manner according to a control signal and based on the arrangement sequences of the signal channels of the integrated circuits that are reconfigured by the sequencers,
- wherein, each of the signal channels is routed to one of the signal terminals simultaneously, each of the signal terminals is a pin of the package, and a different control signal corresponds to a different arrangement sequence of the signal channels,
- wherein when the processing circuit routes at least two signal channels of the signal channels to a single signal terminal of the signal terminals, the processing circuit outputs a conflict situation signal to inform a user to change the routing situation between the signal channels and signal terminals, wherein the conflict situation signal represent which signal terminal of the signal terminals is routed with the at least two signal channels.

11. The circuit as claimed in claim 10, wherein the processing circuit further comprises a mask, coupled between the first distributor and the signal terminals, configured to decide whether to mask the connection between at least one signal channel of the signal channels and the signal terminals.

12. The circuit as claimed in claim 10, wherein the processing circuit further comprises a plurality of masks, coupled between the sequencers and the first distributor, each of the masks is configured to decide whether to mask the connection between at least one signal channel of a corresponding one of the integrated circuits and the signal terminals.

13. The circuit as claimed in claim 12, wherein the processing circuit further comprises a plurality of second distributors, coupled between the sequencers and the masks, and each of the second distributors is configured to distribute a plurality of signal terminals of a corresponding one of the integrated circuits to a plurality of distribution units of the first distributor.

14. The circuit as claimed in claim 10, wherein the processing circuit further comprises: a rearrangement circuit, coupled between the first distributor and the signal terminals, configured to set which signal terminals within the signal terminals are utilized, and the first distributor routes the signal channels to the utilized signal terminals.

15. The circuit as claimed in claim 10, wherein the routing circuit and the integrated circuits are packaged in a package, the signal channels of the same integrated circuit are routed to the signal terminals of the same group wherein the signal terminals of the same group are adjacent to each other.

16. The circuit as claimed in claim 15, wherein a corresponding relationship of the signal channels and the signal terminals routed to in the same group change according to the control signal.

17. The circuit as claimed in claim 15, wherein the pins of the same group are located on a same side of a geometrical shape of the package.

18. The circuit as claimed in claim 10, wherein the routing circuit and the integrated circuits are disposed on a chip.

* * * * *